(12) United States Patent
White et al.

(10) Patent No.: US 8,354,593 B2
(45) Date of Patent: Jan. 15, 2013

(54) HYBRID CONDUCTORS AND METHOD OF MAKING SAME

(75) Inventors: Brian White, Manchester, NH (US); Craig Lombard, Concord, NH (US); David S. Lashmore, Lebanon, NH (US)

(73) Assignee: Nanocomp Technologies, Inc., Concord, NH (US)

( * ) Notice: Subject to any disclaimer, the term of this patent is extended or adjusted under 35 U.S.C. 154(b) by 437 days.

(21) Appl. No.: 12/580,994

(22) Filed: Oct. 16, 2009

(65) Prior Publication Data

US 2011/0005808 A1 Jan. 13, 2011

Related U.S. Application Data

(60) Provisional application No. 61/224,746, filed on Jul. 10, 2009.

(51) Int. Cl.
*H01B 5/00* (2006.01)
(52) U.S. Cl. .................................. 174/126.2
(58) Field of Classification Search ............. 174/36, 174/126.1, 126.2, 250
See application file for complete search history.

(56) References Cited

U.S. PATENT DOCUMENTS

| | | | |
|---|---|---|---|
| 3,090,876 A | 5/1963 | Hutson | |
| 3,109,712 A | 11/1963 | Redfern | |
| 3,706,193 A | 12/1972 | Amato | |
| 3,943,689 A | 3/1976 | Kunz et al. | |
| 4,468,922 A | 9/1984 | McCrady et al. | |
| 5,311,202 A | 5/1994 | Popp et al. | |
| 5,428,884 A | 7/1995 | Tsuzuki | |
| 5,747,161 A | 5/1998 | Iijima | |
| 6,110,590 A | 8/2000 | Zarkoob et al. | |
| 6,143,412 A | 11/2000 | Schueller et al. | |
| 6,308,509 B1 | 10/2001 | Scardino et al. | |
| 6,333,016 B1 | 12/2001 | Resasco et al. | |
| 6,376,971 B1 | 4/2002 | Pelrine et al. | |
| 6,426,134 B1 | 7/2002 | Lavin et al. | |
| 6,452,085 B2 | 9/2002 | Tauchi et al. | |
| 6,495,116 B1 | 12/2002 | Herman | |
| 6,541,744 B2 | 4/2003 | Von Arx et al. | |
| 6,611,039 B2 * | 8/2003 | Anthony | 257/529 |
| 6,682,677 B2 | 1/2004 | Lobovsky et al. | |
| 6,706,402 B2 | 3/2004 | Rueckes et al. | |
| 6,784,656 B2 * | 8/2004 | Breinlinger | 324/756.05 |
| 6,790,426 B1 | 9/2004 | Ohsaki | |
| 6,842,328 B2 | 1/2005 | Schott et al. | |
| 6,908,572 B1 | 6/2005 | Derbyshire et al. | |

(Continued)

FOREIGN PATENT DOCUMENTS

CN 1614772 5/2005

(Continued)

OTHER PUBLICATIONS

Official Action JP Serial No. 2008-540155 dated Nov. 4, 2011.

(Continued)

*Primary Examiner* — William Mayo, III
(74) *Attorney, Agent, or Firm* — Greenberg Traurig, LLP; Chinh H. Pham

(57) ABSTRACT

One method of fabricating hybrid conductors includes complexing conductive metal elements (e.g., silver, gold, copper), transition metal elements, alloys, wires, or combinations thereof, with carbon nanotube materials. In the alternative, the hybrid conductors may be formed by doping the carbon nanotube materials in salt solutions.

21 Claims, 11 Drawing Sheets

U.S. PATENT DOCUMENTS

| | | | |
|---|---|---|---|
| 6,923,946 B2 | 8/2005 | Geohegan et al. | |
| 6,979,709 B2 | 12/2005 | Smalley et al. | |
| 7,045,108 B2 | 5/2006 | Jiang et al. | |
| 7,052,668 B2 | 5/2006 | Smalley et al. | |
| 7,109,581 B2 | 9/2006 | Dangelo et al. | |
| 7,182,929 B1* | 2/2007 | Singhal et al. | 423/592.1 |
| 7,323,157 B2 | 1/2008 | Kinloch et al. | |
| 7,413,474 B2 | 8/2008 | Liu et al. | |
| 7,437,938 B2 | 10/2008 | Chakraborty | |
| 7,491,883 B2 | 2/2009 | Lee et al. | |
| 7,553,472 B2 | 6/2009 | Mouli et al. | |
| 7,611,579 B2 | 11/2009 | Lashmore et al. | |
| 7,615,097 B2 | 11/2009 | McKechnie et al. | |
| 7,615,204 B2 | 11/2009 | Ajayan et al. | |
| 7,727,504 B2 | 6/2010 | Kittrell et al. | |
| 7,745,810 B2 | 6/2010 | Rueckes et al. | |
| 7,750,240 B2 | 7/2010 | Jiang et al. | |
| 7,846,414 B2 | 12/2010 | Harbec et al. | |
| 7,897,248 B2 | 3/2011 | Barrera et al. | |
| 8,071,906 B2 | 12/2011 | Smiljanic et al. | |
| 2001/0003576 A1 | 6/2001 | Klett et al. | |
| 2002/0004028 A1 | 1/2002 | Margrave et al. | |
| 2002/0040900 A1 | 4/2002 | Arx et al. | |
| 2002/0113335 A1 | 8/2002 | Lobovsky et al. | |
| 2002/0130610 A1 | 9/2002 | Gimzewski et al. | |
| 2002/0136681 A1 | 9/2002 | Smalley et al. | |
| 2002/0179564 A1 | 12/2002 | Geobegan et al. | |
| 2003/0133865 A1 | 7/2003 | Smalley et al. | |
| 2003/0134916 A1 | 7/2003 | Hrubesh | |
| 2003/0165648 A1 | 9/2003 | Lobovsky et al. | |
| 2004/0020681 A1* | 2/2004 | Hjortstam et al. | 174/102 SC |
| 2004/0053780 A1 | 3/2004 | Jiang et al. | |
| 2004/0081758 A1 | 4/2004 | Mauthner et al. | |
| 2004/0124772 A1 | 7/2004 | Chen | |
| 2004/0150312 A1 | 8/2004 | McElrath et al. | |
| 2004/0173906 A1* | 9/2004 | Saito et al. | 257/758 |
| 2004/0240144 A1 | 12/2004 | Schott et al. | |
| 2004/0265212 A1 | 12/2004 | Varadan et al. | |
| 2004/0265489 A1 | 12/2004 | Dubin | |
| 2004/0266065 A1 | 12/2004 | Zhang et al. | |
| 2005/0006801 A1 | 1/2005 | Kinloch et al. | |
| 2005/0046017 A1 | 3/2005 | Dangelo | |
| 2005/0063658 A1 | 3/2005 | Crowley | |
| 2005/0067406 A1 | 3/2005 | Rajarajan et al. | |
| 2005/0087222 A1 | 4/2005 | Muller-Werth | |
| 2005/0104258 A1 | 5/2005 | Lennhoff | |
| 2005/0112051 A1 | 5/2005 | Liu et al. | |
| 2005/0170089 A1 | 8/2005 | Lashmore et al. | |
| 2005/0179594 A1 | 8/2005 | Morikawa et al. | |
| 2005/0269726 A1 | 12/2005 | Matabayas | |
| 2006/0118158 A1 | 6/2006 | Zhang et al. | |
| 2006/0252853 A1 | 11/2006 | Ajayan et al. | |
| 2006/0272701 A1 | 12/2006 | Ajayan et al. | |
| 2007/0009421 A1 | 1/2007 | Kittrell et al. | |
| 2007/0029291 A1 | 2/2007 | Boulos et al. | |
| 2007/0036709 A1 | 2/2007 | Lashmore et al. | |
| 2007/0048211 A1 | 3/2007 | Jiang et al. | |
| 2007/0056855 A1 | 3/2007 | Lo et al. | |
| 2007/0087121 A1 | 4/2007 | Chang et al. | |
| 2007/0116627 A1 | 5/2007 | Collier et al. | |
| 2007/0140947 A1 | 6/2007 | Schneider et al. | |
| 2007/0232699 A1 | 10/2007 | Russell et al. | |
| 2007/0236325 A1 | 10/2007 | Bertin et al. | |
| 2007/0277866 A1 | 12/2007 | Sander et al. | |
| 2007/0293086 A1 | 12/2007 | Liu et al. | |
| 2008/0170982 A1 | 7/2008 | Zhang et al. | |
| 2008/0238882 A1 | 10/2008 | Sivarajan et al. | |
| 2009/0042455 A1 | 2/2009 | Mann et al. | |
| 2009/0044848 A1* | 2/2009 | Lashmore et al. | 136/201 |
| 2009/0047513 A1 | 2/2009 | Lashmore | |
| 2009/0117025 A1 | 5/2009 | Lashmore et al. | |
| 2009/0169819 A1 | 7/2009 | Drzaic et al. | |
| 2009/0194525 A1 | 8/2009 | Lee et al. | |
| 2009/0196985 A1 | 8/2009 | Jiang et al. | |
| 2009/0237886 A1 | 9/2009 | Iwai et al. | |
| 2009/0277897 A1 | 11/2009 | Lashmore et al. | |
| 2010/0000754 A1 | 1/2010 | Mann et al. | |
| 2010/0041297 A1 | 2/2010 | Jiang et al. | |
| 2010/0219383 A1 | 9/2010 | Eklund | |
| 2010/0220074 A1 | 9/2010 | Irvin, Jr. et al. | |
| 2010/0243295 A1* | 9/2010 | Allemand et al. | 174/250 |
| 2010/0270058 A1* | 10/2010 | Mahoney et al. | 174/250 |
| 2010/0324656 A1 | 12/2010 | Lashmore et al. | |
| 2010/0328845 A1 | 12/2010 | Hiralal et al. | |
| 2011/0007477 A1 | 1/2011 | Xu et al. | |
| 2012/0045385 A1 | 2/2012 | Lashmore et al. | |
| 2012/0118552 A1 | 5/2012 | White et al. | |

FOREIGN PATENT DOCUMENTS

| | | |
|---|---|---|
| EP | 1160861 A2 | 12/2001 |
| JP | 1958-072036 | 5/1983 |
| JP | 2000-058228 | 2/2000 |
| JP | 2003-298338 | 10/2003 |
| JP | 2004-315297 | 11/2004 |
| JP | 2005-075672 | 3/2005 |
| JP | 2005-109870 | 4/2005 |
| JP | 2005/281672 | 10/2005 |
| JP | 2006-335604 | 12/2006 |
| JP | 2002-515847 | 5/2008 |
| JP | 2011-508364 | 3/2011 |
| KR | 2005-0007886 | 1/2005 |
| WO | WO 98/39250 | 9/1998 |
| WO | WO 2005/098084 | 10/2005 |
| WO | WO 2006/073460 | 7/2006 |
| WO | WO 2007/003879 | 1/2007 |
| WO | WO 2007/015710 | 2/2007 |
| WO | WO 2007/086909 | 8/2007 |
| WO | WO 2007/089118 | 8/2007 |
| WO | WO 2008/036068 | 3/2008 |
| WO | WO 2008/048286 | 4/2008 |
| WO | WO 2006/099156 | 9/2009 |
| WO | WO 2011/005964 | 1/2011 |

OTHER PUBLICATIONS

Supplementary European Search Report based on EP 08797307 dated Mar. 29, 2011.

Supplementary European Search Report based on EP 06851749 dated Apr. 1, 2011.

Gou, J.G., "*Passage: Nanotube Bucky Papers and Nanocomposites*", Ph.D. Dissertation, Marburg an Der Lahn, pp. 93-126, Jan. 1, 2002.

Hanson, G.W., "Fundamental Transmitting Properties of Carbon Nanotube Antennas", IEEE Transactions on Antennas and Propagation, vol. 53, No. 11, pp. 3426-3435, Nov. 2005.

Lee et al., "*Synthesis of Carbon Nanotubes Over Gold Nanoparticle Supported Catalysts*", Carbon, vol. 43, pp. 2654-2663, May 13, 2005.

Merriam Webster Dictionary definition of "along", available at http://merriam-webster.com/dictionary/along (retrieved Sep. 16, 2010).

"Metallurgical & Chemical Engineering", McGraw Publishing Co., vol. 15, No. 5, pp. 258-259, Dec. 15, 1916.

Schaevitz et al., "*A Combustion-Based Mems Thermoelectric Power Generator*", The 11th Conference on Solid-State Sensors and Actuators, Munich, Germany, Jun. 10-14, 2001.

Xiao et al., "*High-Mobility Thin-Film Transistors Based on Aligned Carbon Nanotubes*", Applied Physics Letters, vol. 83, No. 1, pp. 150-152, Jul. 7, 2003.

Office Action cited in U.S. Appl. No. 11/413,512 mailed Jul. 8, 2010.

Office Action cited in U.S. Appl. No. 11/415,927 mailed Feb. 22, 2010.

Office Action cited in U.S. Appl. No. 11/415,927 mailed Sep. 9, 2010.

Office Action cited in U.S. Appl. No. 11/715,756 mailed Jan. 25, 2010.

Office Action cited in U.S. Appl. No. 11/818,279 mailed Jun. 2, 2010.

Office Action cited in U.S. Appl. No. 12/187,278 mailed Jun. 11, 2010.

Office Action cited in U.S. Appl. No. 12/191,765 mailed May 14, 2010.

Office Action cited in U.S. Appl. No. 12/390,906 mailed Jul. 9, 2010.

International Search Report based on PCT/US2009/043209 dated Mar. 3, 2010.

International Search Report based on PCT/US2010/041374 dated Sep. 8, 2010.

European Search Report based on EP 06849762.7 dated Jan. 14, 2010.

Australian Examiner's Report cited in AU Serial No. 2006249601 dated Jun. 24, 2010.
Australian Examiner's Report cited in AU Serial No. 2006350110 dated Feb. 9, 2010.
Biro, et al., "Direct Synthesis of Multi-Walled and Single-Walled Carbon Nanotubes by Spray-Pyrolysis", J. Optoelectronics and Advanced Materials, Sep. 2003; vol. 5, No. 3, pp. 661-666.
Kaili, et al., "Spinning Continuous Carbon Nanotube Yarns", Nature, Oct. 24, 2002, vol. 419, p. 801.
Li, et al., "Direct Spinning of Carbon Nanotube Fibers from Chemical Vapor Deposition Synthesis", Apr. 9, 2004, vol. 304, pp. 276-278.
Tapaszto, et al., "Diameter and Morphology Dependence on Experimental Conditions of Carbon Nanotube Arrays Grown by Spray Pyrolysis", Carbon, Jan. 2005; vol. 43, pp. 970-977.
Non-Final Office Action in U.S. Appl. No. 12/140,263 mailed Sep. 20, 2010.
Non-Final Office Action in U.S. Appl. No. 12/187,278 mailed Sep. 29, 2010.
Non-Final Office Action in U.S. Appl. No. 12/038,408 mailed Oct. 14, 2010.
Non-Final Office Action in U.S. Appl. No. 12/437,537 mailed Oct. 25, 2010.
Final Office Action in U.S. Appl. No. 12/191,765 mailed Oct. 28, 2010.
Supplementary European Search Report based on EP 06851553.5 dated Nov. 15, 2010.
Moisala et al., "Single-walled carbon nanotube synthesis using ferrocene and iron pentacarbonyl in a laminar flow reactor," *Chemical Engineering Science*, 61(13), pp. 4393-4402 (Jul. 2006).
Official Action cited in JP Serial No. 2008-540155 dated Mar. 8, 2011.
Final Office Action in U.S. Appl. No. 12/140,263 mailed Mar. 9, 2011.
Non-Final Office Action in U.S. Appl. No. 11/415,927 mailed Mar. 10, 2011.
Non-Final Office Action in U.S. Appl. No. 12/180,300 mailed Mar. 16, 2011.
Non-Final Office Action in U.S. Appl. No. 12/191,765 mailed Apr. 4, 2011.
Non-Final Office Action in U.S. Appl. No. 12/566,229 mailed Apr. 6, 2011.
Pipes et al., "Helical carbon nanotube arrays: mechanical properties," Composities Science and Technology. 62: 419-428 (2002).
Canadian Search Report for Canadian Patent Application No. 2,609,712 mailed Jul. 30, 2012.
European Search Report for European Patent Application No. 10160098.9 mailed Mar. 9, 2012.
European Search Report for European Patent Application No. 12160856.6 mailed May 10, 2012.
European Search Report for European Patent Application No. 08726128.5 mailed Aug. 10, 2012.
International Search Report for International Patent Application No. PCT/US12/20194 mailed May 1, 2012.
International Search Report for International Patent Application No. PCT/US12/33300 mailed Jul. 5, 2012.
Japanese Office Action issued for Japanese Patent Application No. 2009-551705 mailed on May 29, 2012.
Office Action issued for Australian Patent Application No. 2008311234 mailed on Feb. 14, 2012.
Office Action issued for U.S. Appl. No. 12/038,408 mailed on Feb. 23, 2012.
Office Action issued for U.S. Appl. No. 12/580,994 mailed on Mar. 12, 2012.
Office Action issued for U.S. Appl. No. 12/437,538 mailed on Mar. 26, 2012.
Office Action issued for U.S. Appl. No. 12/566,229 mailed on May 4, 2012.
Office Action issued for U.S. Appl. No. 12/437,535 mailed on Aug. 22, 2012.

\* cited by examiner

HYBRID CONDUCTORS AND METHOD OF MAKING SAME

RELATED U.S. APPLICATION(S)

The application claims priority to U.S. Provisional Patent Application Ser. No. 61/224,746, filed Jul. 10, 2009, which is hereby incorporated herein by reference in its entirety for all purposes.

The application is related to U.S. patent application Ser. No. 12/187,278 filed Aug. 6, 2008, published Feb. 12, 2009 as U.S. Patent Application No. 20090042455, which is hereby incorporated herein by reference in its entirety for all purposes.

TECHNICAL FIELD

The present invention relates to electrical and thermal conductors, and more particularly, to hybrid conductors having enhanced conductivity and current capacity over a wide range of frequencies.

BACKGROUND ART

Carbon nanotubes are known to have extraordinary tensile strength, including high strain to failure and relatively high tensile modulus. Carbon nanotubes may also be highly resistant to fatigue, radiation damage, and heat. To this end, the addition of carbon nanotubes to composite materials can increase tensile strength and stiffness of the composite materials.

Within the last fifteen (15) years, as the properties of carbon nanotubes have been better understood, interests in carbon nanotubes have greatly increased within and outside of the research community. One key to making use of these properties is the synthesis of nanotubes in sufficient quantities for them to be broadly deployed. For example, large quantities of carbon nanotubes may be needed if they are to be used as high strength components of composites in macroscale structures (e.g., structures having dimensions greater than 1 cm).

One common route to nanotube synthesis can be through the use of gas phase pyrolysis, such as that employed in connection with chemical vapor deposition. In this process, a nanotube may be formed from the surface of a catalytic nanoparticle. Specifically, the catalytic nanoparticle may be exposed to a gas mixture containing carbon compounds serving as feedstock for the generation of a nanotube from the surface of the nanoparticle.

Recently, one promising route to high-volume nanotube production has been to employ a chemical vapor deposition system that grows nanotubes from catalyst particles that "float" in the reaction gas. Such a system typically runs a mixture of reaction gases through a heated chamber within which the nanotubes may be generated from nanoparticles that have precipitated from the reaction gas. Numerous other variations may be possible, including ones where the catalyst particles may be pre-supplied.

In cases where large volumes of carbon nanotubes may be generated, however, the nanotubes may attach to the walls of a reaction chamber, resulting in the blockage of nanomaterials from exiting the chamber. Furthermore, these blockages may induce a pressure buildup in the reaction chamber, which can result in the modification of the overall reaction kinetics. A modification of the kinetics can lead to a reduction in the uniformity of the material produced.

An additional concern with nanomaterials may be that they need to be handled and processed without generating large quantities of airborne particulates, since the hazards associated with nanoscale materials are not yet well understood.

The processing of nanotubes or nanoscale materials for macroscale applications has steadily increased in recent years. The use of nanoscale materials in textile fibers and related materials has also been increasing. In the textile art, fibers that are of fixed length and that have been processed in a large mass may be referred to as staple fibers. Technology for handling staple fibers, such as flax, wool, and cotton has long been established. To make use of staple fibers in fabrics or other structural elements, the staple fibers may first be formed into bulk structures such as yarns, tows, or sheets, which then can be processed into the appropriate materials.

Accordingly, it would be desirable to provide a material that can take advantage of the characteristics and properties of carbon nanotubes, so that a conductor made of carbon nanotubes can be processed for end use applications.

SUMMARY OF THE INVENTION

The present invention provides, in accordance with one embodiment, a hybrid conductor comprising a plurality of nanostructures, each having a surface area; a member having a geometric profile defined by the plurality of nanostructures; and a conductive material positioned so that it is in contact with less than the total surface area of the plurality of nanostructures, wherein the combination of the conductive material and the plurality of nanostructures enhances conductivity while decreasing resistivity along the length of the member.

In one embodiment, the nanostructures are made from one of carbon, copper, silver, boron, boron-nitride, or a combination thereof. In one embodiment, the plurality of nanostructures are doped in a solution having one of fluoride salt, chloride salt, bromide salt, iodate salt, nitrate salt, sulfate salt, or a combination thereof. In one embodiment, the member defined by the plurality of nanostructures includes one of a yarn or a sheet. In one embodiment, the member includes one of a plurality of yarns, a plurality of sheets, or a combination thereof. In one embodiment, the conductive material includes one of a conductive coating in contact with less than the total surface area of the plurality of nanostructures, a conductive wire in contact with less than the total surface area of the plurality of nanostructures, or a combination thereof. In one embodiment, the conductive material comprises one of copper, aluminum, titanium, platinum, nickel, gold, silver, or a combination thereof.

In some embodiments, at least one of a heat conductor, a low eddy current, low resistance winding for an electric motor, and a low eddy current, low resistance winding for a solenoid, may be produced, incorporating at least one of the hybrid conductors embodiments as disclosed above.

Another embodiment discloses a hybrid conductor comprising: a plurality of nanostructures, wherein the plurality of nanostructures are doped in a solution having one of fluoride salt, chloride salt, bromide salt, iodate salt, nitrate salt, sulfate salt, or a combination thereof; and a member having a geometric profile defined by the plurality of nanostructures, wherein the plurality of nanostructures enhances conductivity while decreasing resistivity along the length of the member. In one embodiment, the member defined by the plurality of nanostructures includes one of a yarn or a sheet. In one embodiment, the member includes one of a plurality of yarns, a plurality of sheets, or a combination thereof.

Another embodiment discloses a method of producing a hybrid conductor, the method comprising: providing a plurality of nanostructures, each having a surface area; generating a member having a geometric profile from the plurality of nanostructures; and contacting a conductive material with less than the total surface area of the plurality of nanostructures, wherein the combination of the conductive material and the plurality of nanostructures enhances conductivity while decreasing resistivity along the length of the member.

In one embodiment, wherein, in the step of providing, the nanostructures are produced from one of carbon, copper, silver, boron, boron-nitride, or a combination thereof. In one embodiment, the method further comprises, concomitant to the producing step, doping the plurality of nanostructures in a solution having one of fluoride salt, chloride salt, bromide salt, iodate salt, nitrate salt, sulfate salt, or a combination thereof. In one embodiment, wherein, in the step of generating, the member defined by the plurality of nanostructures includes one of a yarn or a sheet. In one embodiment, wherein, in the step of generating, the member includes one of a plurality of yarns, a plurality of sheets, or a combination thereof. In one embodiment, wherein the step of contacting includes one of coating the member with the conductive material to permit contact with less than the total surface area of the plurality of nanostructures, intertwining a conductive wire with less than the total surface area of the plurality of nanostructures, or a combination thereof. In one embodiment, wherein, in the step of contacting, the conductive material and the conductive wire includes one of copper, aluminum, titanium, platinum, nickel, gold, silver, or a combination thereof.

DESCRIPTION OF SPECIFIC EMBODIMENTS

Figure 1A:
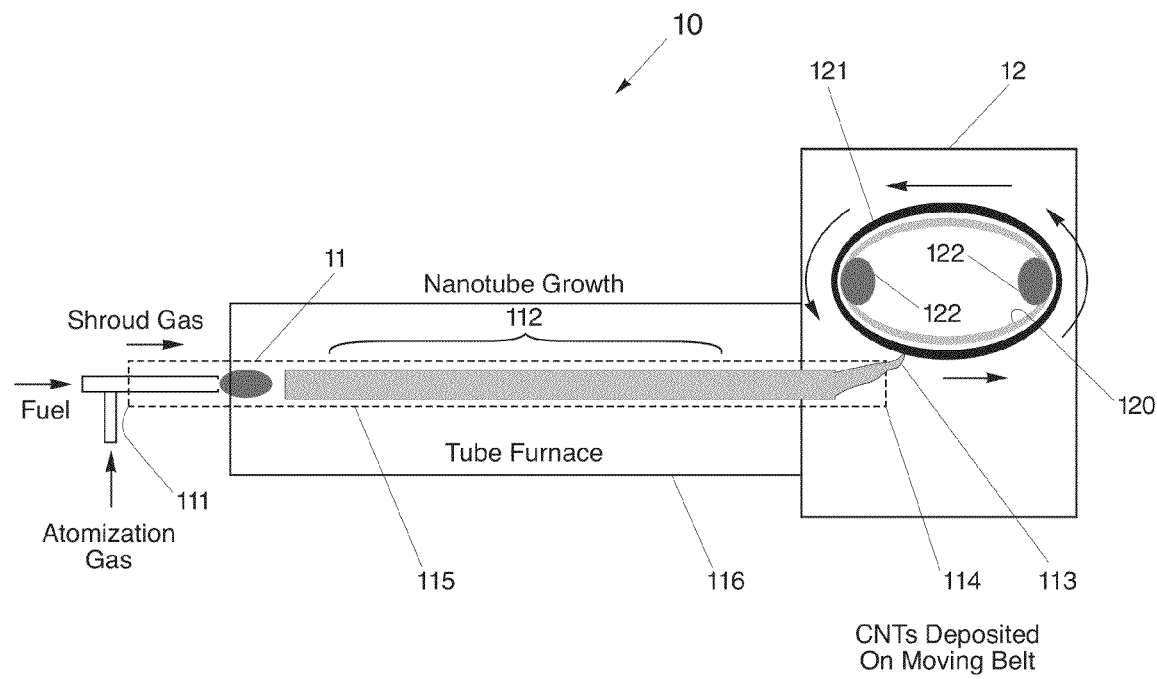
FIGS. 1A-D illustrate chemical vapor deposition (CVD) systems for fabricating nanotubes, in accordance with one embodiment of the present invention.

The need to carry relatively high current pulses between two movable conductors, such as a high energy capacitor, a ground strap, a bus bar or bus pipe, or pulse generating circuit, to an external circuit without degradation of the waveform or without heating of a junction requires careful engineering of the conduction path. This can be important where the conductor may be subject to movement which might cause fatigue damage in more commonly used copper conductors. To satisfy this need, the present invention provides, in an embodiment, an approach for carrying relatively high current pulses through the use of a nanostructure-based conducting member, such as that made from carbon nanotubes in the form of, for example, a ribbon, a spun cable, or a sheet.

Presently, there exist multiple processes and variations thereof for growing nanotubes, and forming sheets or cable structures made from these nanotubes. These include: (1) chemical vapor deposition (CVD), a common process that can occur at near ambient or at high pressures, and at temperatures above about 400° C., (2) arc discharge, a high temperature process that can give rise to tubes having a high degree of perfection, and (3) laser ablation.

The present invention, in one embodiment, employs a CVD process or similar gas phase pyrolysis procedures known in the industry to generate the appropriate nanostructures, including carbon nanotubes. Growth temperatures for a CVD process can be comparatively low ranging, for instance, from about 400° C. to about 1350° C. Carbon nanotubes, both single wall (SWNT) or multiwall (MWNT), may be grown, in an embodiment of the present invention, by exposing nanoscaled catalyst particles in the presence of reagent carbon-containing gases (e.g., gaseous carbon source). In particular, the nanoscaled catalyst particles may be introduced into the reagent carbon-containing gases, either by addition of existing particles or by in situ synthesis of the particles from a metal-organic precursor, or even non-metallic catalysts. Although both SWNT and MWNT may be grown, in certain instances, SWNT may be selected due to their relatively higher growth rate and tendency to form rope-like structures, which may offer advantages in handling, thermal conductivity, electronic properties, and strength.

The strength of the individual carbon nanotubes generated in connection with the present invention may be about 30 GPa or more. Strength, as should be noted, is sensitive to defects. However, the elastic modulus of the individual carbon nanotubes fabricated in the present invention may not be sensitive to defects and can vary from about 0.9 to about 1.2 TPa. Moreover, the strain to failure of these nanotubes, which generally can be a structure sensitive parameter, may range from a about 10% to a maximum of about 25% in the present invention.

Furthermore, the nanotubes of the present invention can be provided with relatively small diameter. In an embodiment of the present invention, the nanotubes fabricated in the present invention can be provided with a diameter in a range of from less than about 1 nm to about 10 nm.

The nanotubes of the present invention can also be used as a conducting member to carry relatively high current similar to a Litz wire or cable. However, unlike a Litz wire or cable soldered to a connector portion, the nanotube conducting member of the present invention can exhibit relatively lower impedance in comparison. In particular, it has been observed in the present invention that the shorter the current pulses, the better the nanotube-based wire cable or ribbon would perform when compared with a copper ribbon or Litz wire. One reason for the observed better performance may be that the effective frequency content of the pulse, which can be calculated from the Fourier Transform of the waveform for current pulses that are square and short, e.g., about 100 ms to less than about 1 ms, can be very high. Specifically, individual carbon nanotubes of the present invention can serve as conducting pathways, and due to their small size, when bulk structures are made from these nanotubes, the bulk structures can contain extraordinarily large number of conducting elements, for instance, on the order of $10^{14}/cm^2$ or greater.

Carbon nanotubes of the present invention can also demonstrate ballistic conduction as a fundamental means of conductivity. Thus, materials made from nanotubes of the present invention can represent a significant advance over copper and other metallic conducting members under AC current conditions. However, joining this type of conducting member to an external circuit requires that essentially each nanotube be electrically or thermally contacted to avoid contact resistance at the junction.

It should be noted that although reference is made throughout the application to nanotubes synthesized from carbon, other compound(s), such as boron, $MoS_2$, or a combination thereof may be used in the synthesis of nanotubes in connection with the present invention. For instance, it should be understood that boron nanotubes may also be grown, but with different chemical precursors. In addition, it should be noted that boron may also be used to reduce resistivity in individual carbon nanotubes. Furthermore, other methods, such as plasma CVD or the like can also be used to fabricate the nanotubes of the present invention.

System for Fabricating Nanotubes

With reference now to FIG. 1A, there is illustrated a system 10, similar to that disclosed in U.S. patent application Ser. No. 11/488,387 filed Jul. 17, 2006, published Feb. 15, 2007 as U.S. Patent Application No. 20070036709 ('the "709 Application'), which is incorporated herein by reference, for use in the fabrication of nanotubes. System 10, in an embodiment, may be coupled to a synthesis chamber 11. The synthesis chamber 11, in general, includes an entrance end 111, into which reaction gases (i.e., gaseous carbon source) may be supplied, a hot zone 112, where synthesis of extended length nanotubes 113 may occur, and an exit end 114 from which the products of the reaction, namely the nanotubes and exhaust gases, may exit and be collected. The synthesis chamber 11, in an embodiment, may include a quartz tube 115 extending through a furnace 116. The nanotubes generated by system 10, on the other hand, may be individual single-walled nanotubes, bundles of such nanotubes, and/or intertwined single-walled nanotubes (e.g., ropes of nanotubes).

System 10, in one embodiment of the present invention, may also include a housing 12 designed to be substantially airtight, so as to minimize the release of potentially hazardous airborne particulates from within the synthesis chamber 11 into the environment. The housing 12 may also act to prevent oxygen from entering into the system 10 and reaching the synthesis chamber 11. In particular, the presence of oxygen within the synthesis chamber 11 can affect the integrity and compromise the production of the nanotubes 113.

System 10 may also include a moving belt 120, positioned within housing 12, designed for collecting synthesized nanotubes 113 made from a CVD process within synthesis chamber 11 of system 10. In particular, belt 120 may be used to permit nanotubes collected thereon to subsequently form a substantially continuous extensible structure 121, for instance, a non-woven sheet. Such a non-woven sheet may be generated from compacted, substantially non-aligned, and intermingled nanotubes 113, bundles of nanotubes, or intertwined nanotubes (e.g., ropes of nanotubes), with sufficient structural integrity to be handled as a sheet.

To collect the fabricated nanotubes 113, belt 120 may be positioned adjacent the exit end 114 of the synthesis chamber 11 to permit the nanotubes to be deposited on to belt 120. In one embodiment, belt 120 may be positioned substantially parallel to the flow of gas from the exit end 114, as illustrated in FIG. 1A. Alternatively, belt 120 may be positioned substantially perpendicular to the flow of gas from the exit end 114 and may be porous in nature to allow the flow of gas carrying the nanomaterials to pass therethrough. Belt 120 may be designed as a continuous loop, similar to a conventional conveyor belt. To that end, belt 120, in an embodiment, may be looped about opposing rotating elements 122 (e.g., rollers) and may be driven by a mechanical device, such as an electric motor. Alternatively, belt 120 may be a rigid cylinder. In one embodiment, the motor may be controlled through the use of a control system, such as a computer or microprocessor, so that tension and velocity can be optimized.

Figure 1B:
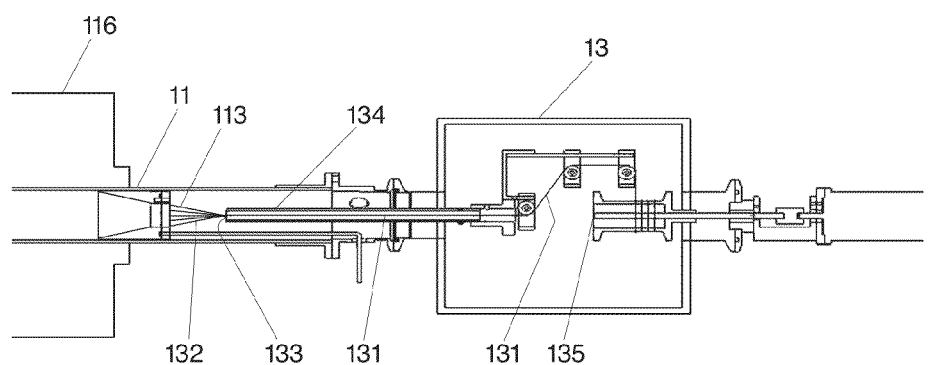

In an alternate embodiment, instead of a non-woven sheet, the fabricated single-walled nanotubes 113 may be collected from synthesis chamber 11, and a yarn 131 may thereafter be formed as illustrated in FIG. 1B. Specifically, as the nanotubes 113 emerge from the synthesis chamber 11, they may be collected into a bundle 132, fed into intake end 133 of a spindle 134, and subsequently spun or twisted into yarn 131 therewithin. It should be noted that a continual twist to the yarn 131 can build up sufficient angular stress to cause rotation near a point where new nanotubes 113 arrive at the spindle 134 to further the yarn formation process. Moreover, a continual tension may be applied to the yarn 131 or its advancement into collection chamber 13 may be permitted at a controlled rate, so as to allow its uptake circumferentially about a spool 135.

Typically, the formation of the yarn 131 results from a bundling of nanotubes 113 that may subsequently be tightly spun into a twisting yarn. Alternatively, a main twist of the yarn 131 may be anchored at some point within system 10 and the collected nanotubes 113 may be wound on to the twisting yarn 131. Both of these growth modes can be implemented in connection with the present invention.

Figure 1C:
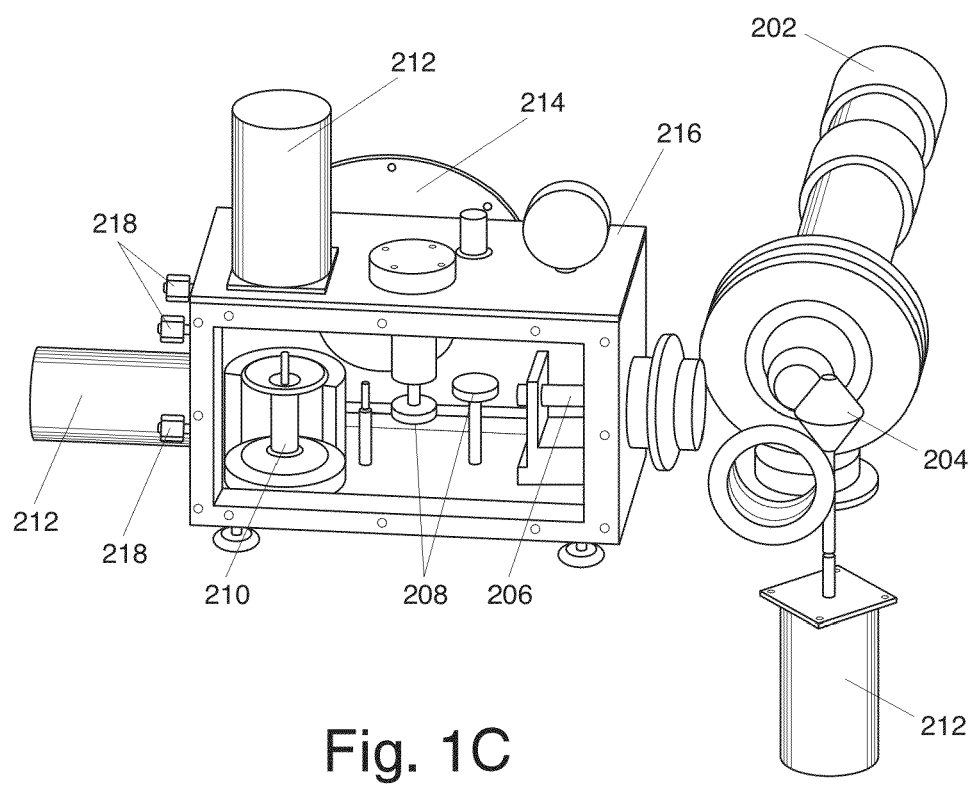
Figure 1D:
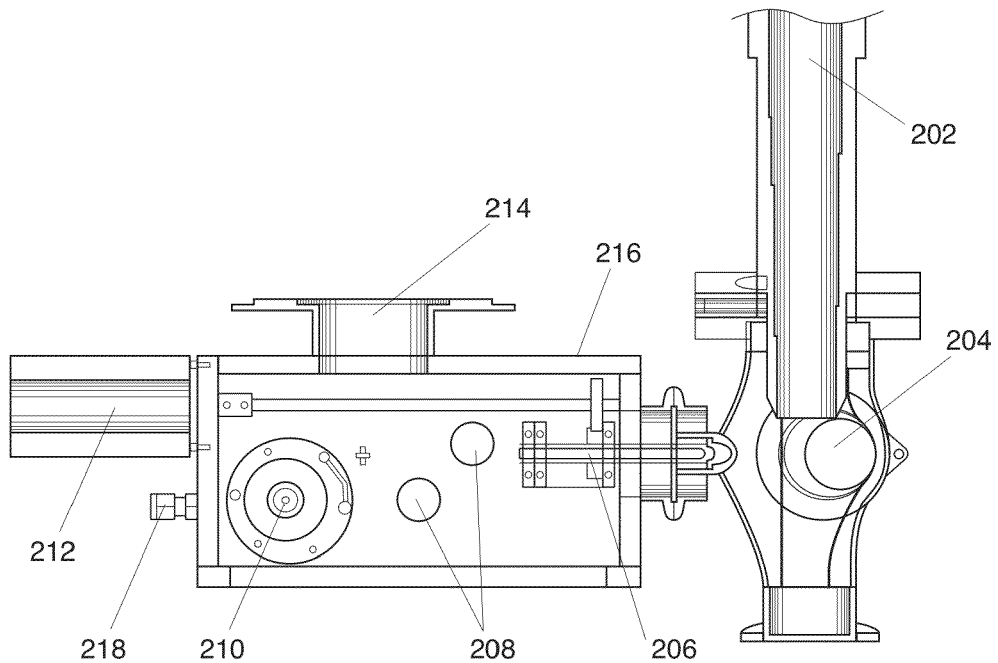

In one embodiment, carbon nanotubes created in a furnace may be pulled along a furnace tube 202 and collected on a take-up reel 210 as shown in FIGS. 1C-D. As shown in the perspective view (FIG. 1C), carbon nanotubes created from the furnace tube 202 may be pulled along the length of the furnace tube 202 and impinge on a cone-shaped anchor 204. The anchor 204 functions similar to that of a reel in collecting the carbon nanotubes. The carbon nanotubes may subsequently be pulled from the anchor 204 and directed into a wiggle tube 206 within a spinning box 216 (best shown in the top-down view of FIG. 1D). The wiggle tube is capable of spinning the carbon nanotubes into a yarn. The yarn of carbon nanotubes coming off the wiggle tube 206 may be directed to tension gauges 208 for providing the necessary tension to the yarn. In some instances, the tension gauges 208 are capable of measuring the tension as to indicate to motors 212 how fast to spin in order to collect the yarn about the take-up reel 210.

In this example, a motor 212 controls the wiggle tube 206 through an extending rod within the spinning box 216.

Another motor 212 drives the anchor 204, the motor 212 being disposed underneath the anchor 204 (best seen in FIG. 1C). And another motor 212 controls the spinning speed of the take-up reel 210, the motor 212 being disposed on a top-side of the spinning box 216 (also best seen in FIG. 1C). The spinning box 216 further includes a blow-out membrane 214 to mitigate explosions within the spinning box 216 itself. A plurality of connectors 218 may also be disposed about a side of the spinning box 216, the connectors 218 being capable of providing inert gas to the system (e.g., helium) and for carrying out oxygen and hydrogen measurements with appropriate sensors.

In some chamber systems, the spinning system provides a false spin on the yarn. In other chamber systems, the spinning system provides a true spin on the yarn. In some embodiments, the spinning is carried out in line with the yarns coming off the system. In other embodiments, the spinning is at 90 degrees with respect to the yarns coming off the system.

One method for generating and growing very large numbers of extended length carbon nanotubes (CNTs) from a fixed substrate is provided in U.S. patent application Ser. No. 11/035,471 filed Jan. 14, 2005, published Aug. 4, 2005 as U.S. Patent Application No. 20050170089, which is hereby incorporated herein by reference. The method includes, among other things, spinning a group of nanoscale tubes or fibers into a yarn. Thereafter, the yarn can be collected or further spun using conventional fiber processing means. Such an approach, in an embodiment, can employ any known protocols available in the art, and can be incorporated into a manufacturing process of the present invention.

Another method for manufacturing a conducting member made from a nanostructure-based material is provided in U.S. application Ser. No. 12/437,537, filed May 7, 2009, which is hereby incorporated herein by reference.

Conductor

Figure 2:
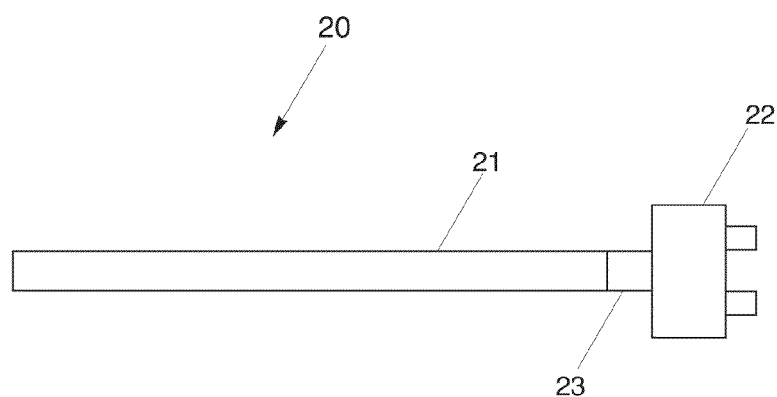
FIG. 2 illustrates an electrically and thermally conductor in accordance with one embodiment of the present invention.

To carry relatively high current pulses between two movable conductors, such as a high energy capacitor, a ground strap, a bus bar or bus pipe, or pulse generating circuit, to an external circuit without degradation of the waveform or without heating of a junction, the present invention provides, in an embodiment, a conductor 20, such as that shown in FIG. 2. The conductor 20 can include, among other things, a conductive nanostructure-based material 21, a connector portion 22, and a coupling mechanism 23 made from a material capable of providing substantially low resistance coupling, while substantially maximizing the number of conductive nanostructures that can be actively involved in conductivity.

In accordance with one embodiment, the conductor 20 includes a conducting member 21 made from a conductive nanostructure-based material. The conductive nanostructure-based material, in an embodiment, may be yarns, ribbons, wires, cables, tapes or sheets (e.g., woven or non-woven sheets) made from carbon nanotubes fabricated in a manner similar to that disclosed above in the '709 Application. In an embodiment, conducting member 21 may be made from one of carbon, copper, silver, boron-nitride, boron, $MoS_2$, or a combination thereof. Moreover, the material from which the conducting member 21 may be made can include, in an embodiment, graphite of any type, for example, such as that from pyrograph fibers.

The conductor 20 can also include a connector portion 22 to which the conducting member 21 may be joined. In one embodiment, the connector portion 22 may be made from a metallic material, such as copper, aluminum, gold, silver, silver coated copper, cadmium, nickel, tin, bismuth, arsenic, alloys of these metals, boron, boron nitride, a combination thereof, or other materials capable of being electrically and/or thermally conductive. The connector portion 22 may also be made from non-metallic material, such as those having glassy carbons, ceramics, silicon, silicon compounds, gallium arsenide or similar materials, or a combination thereof, so long as the material can be electrically and/or thermally conductive. The connector portion 22, in and embodiment, when coupled to conducting member 21, permits relatively high current from a source that may be carried by the conducting member 21 to be directed to an external circuit without substantial degradation.

To do so, the conductor 20 may further include a coupling mechanism 23 situated between the conducting member 21 and the connector portion 22, so as to join the conducting member 21 to the connector portion 22. In one embodiment, the coupling mechanism 23 may be made from a glassy carbon material capable of providing substantially low resistance coupling. Glassy carbon, in general, may be a form of carbon related to carbon nanotubes and can contain a significant amount of graphene like ribbons comprising a matrix of amorphous carbon. These ribbons include $sp^2$ bonded ribbons that can be substantially similar to the $sp^2$ bonded nanotubes. As a result, they can have relatively good thermal and electrical conductivity. Examples of precursor materials from which glassy carbon can be made include furfuryl alcohol, RESOL resin (i.e., catalyzed alkyl-phenyl formaldehyde), PVA, or liquid resin or any material known to form glassy carbon when heat treated. Of course, other commercially available glassy carbon materials or precursor materials can be used.

In addition, coupling mechanism 23 may also provide the conducting member 21 with substantially uniform contact to the connector portion 22 across a contact surface area on the connector portion 22. To that end, the coupling mechanism 23 can act to substantially maximize the number of conductive nanostructures within the conducting member 21 that can be actively involved in conductivity to enhance efficiency of electrical and thermal transport. For instance, relatively high current from a source and carried by the conducting member 21 can be directed to an external circuit without substantial degradation. The conductor 20 of the present invention, thus, can be used to enable efficient conduction to a standard connector for use in a traditional electrical and/or thermal circuit systems. In particular, conductor 20 can enable efficient interaction, for instance, through electrical and/or thermal conduction, between a nanoscale environment and the traditional electrical and/or thermal circuit system.

For comparison purposes, the electrical and thermal conduction properties for glassy carbon is compared to those properties exhibited by graphite. As illustrated in Table 1 below, the presence of the graphene ribbons can enhance the electrical and therefore the thermal conductivity of glassy carbon relative to that observed with graphite.

TABLE 1

| Parameter | Graphite | Glassy Carbon |
| --- | --- | --- |
| Electrical resistivity | $14.70 \times 10^{-4}$ ohm-cm | $0.50 \times 10^{-4}$ ohm-cm |
| Thermal conductivity | 95 w/m° K. | 6.3 w/m° K. |

In another embodiment, there is provided a method for making a conductor of the present invention. The method includes initially providing a conducting member, similar to conducting member 21, made from a nanostructure-based material, and a connector portion, similar to connector portion 22, to which the conducting member may be joined. The nanostructure-based material, in one embodiment, can be those made from conductive carbon nanotube, for instance, yarns, tapes, cables, ribbons, or sheets made from carbon nanotubes. The connector portion, on the other hand, may be made from a metallic material, such as copper, nickel, aluminum, silver, gold, cadmium, tin, bismuth, arsenic, alloys of these metals, boron, boron-nitride, other conductive metals, any conductive metals coated with gold or silver, or a combination thereof. The connector portion may also be made from non-metallic material, such as those having glassy carbon forms, ceramics, silicon, silicon compounds, gallium arsenide, or similar materials, so long as the material can be electrically and/or thermally conductive.

Next, a coupling mechanism, similar to coupling mechanism 23, may be placed at a junction between the conducting member and the connector portion. In an embodiment, the coupling mechanism may be a glassy carbon precursor, such as furfuryl alcohol, Resol resin, PVA or any material known to form glassy carbon when heat treated that can be deposited into the junction. It should be appreciated that the tendency of the glassy carbon resin or material to "wet" the nanotubes in the conducting member can help to coat each individual nanotube, so that each nanotube can contribute to electron or thermal transport.

The conducting member and connector portion may thereafter be held against one another, while the junction between the conducting member and the connector portion may be heated to a temperature range sufficient to pyrolyze the glassy carbon precursor to form a glassy carbon low resistance coupling mechanism. In one embodiment, the minimum temperature of pyrolysis should be at least in the neighborhood of about 400° C. to about 450° C. If pyrolysis is carried out in an inert atmosphere, the temperature may need to be higher to permit the pyrolysis process to go to completion.

It should be appreciated that materials that may be sensitive to this temperature may not be suitable for this invention. Moreover, pyrolysis need not go to completion for this junction to offer substantially superior contact resistance to the traditional means for coupling conducting members.

Figure 3:
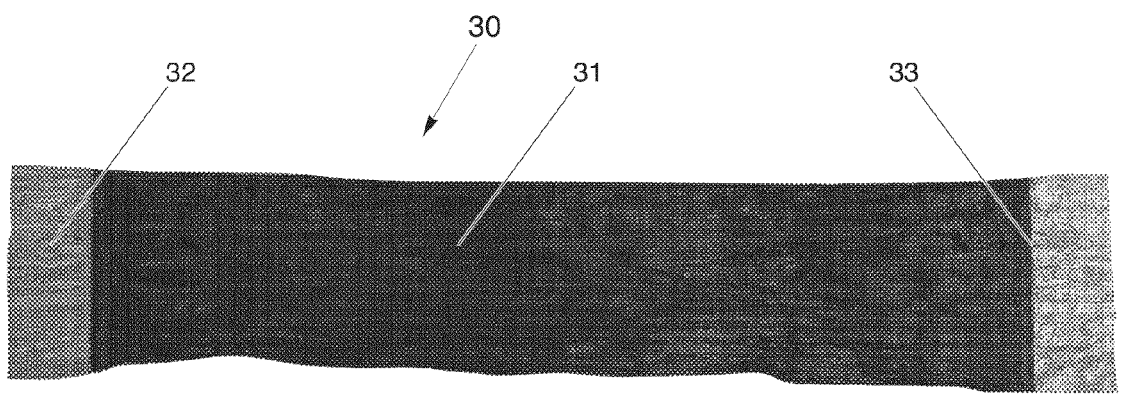
FIG. 3 illustrates an electrically and thermally conductor in accordance with another embodiment of the present invention.

Looking now at FIG. 3, in accordance with another embodiment of the present invention, there is shown a conductor 30, for carrying relatively high current from a source to an external circuit without substantial degradation of the waveform or without substantially heating of a junction.

In the embodiment shown in FIG. 3, conductor 30 includes a conducting member 31 made from a conductive nanostructure-based material. The conductive nanostructure-based material, in an embodiment, may include yarns, ribbons, cables, tapes or sheets (e.g., woven or non-woven sheets) made from carbon nanotubes fabricated in a manner similar to that disclosed above in the '709 Application. In an embodiment, conducting member 31 may be made from one of carbon, copper, silver, boron-nitride, boron, $MoS_2$, or a combination thereof. The material from which the conducting member 31 may be made can also include, in an embodiment, graphite of any type, for example, such as that from pyrograph fibers.

Conductor 30, as illustrated, can also include a connector portion 32 at each of opposing ends of the conducting member 31. In one embodiment of the invention, connector portion 32 may be a coating deposited, such as electroplating, directly on each end of conducting member 31. Deposition or electroplating of connector portion 32 on to conducting member 31 can be carried out using methods well known in the art. Examples of electroplated connector portion 32 include gold, silver, nickel, aluminum, copper, bismuth, tin, zinc, cadmium, tin-nickel alloy, copper alloy, tin-zinc alloy, bismuth-copper alloy, cadmium-nickel alloy, other conductive metals and their alloys, or a combination thereof.

Connector portion 32, in an embodiment, may be deposited or electroplated on to conducting member 31 substantially uniformly, so as to permit substantially uniform contact of the nanotubes in conducting member 31 across a contact surface area on the connector portion 32. As such, the connector portion 32 can act to substantially maximize the number of conductive nanostructures within the conducting member 31 that can be actively involved in conductivity to enhance efficiency of electrical and thermal transport and reduce contact resistance. To that end, relatively high current from a source and carried by the conducting member 31 can be directed to an external circuit without substantial degradation. The conductor 30, thus, can be used to enable efficient interaction, for instance, through electrical and/or thermal conduction, between a nanoscale environment and the traditional electrical and/or thermal circuit system, as well as conduction to a standard connector for use in a traditional electrical and/or thermal circuit systems.

Figures 4A, 4B:
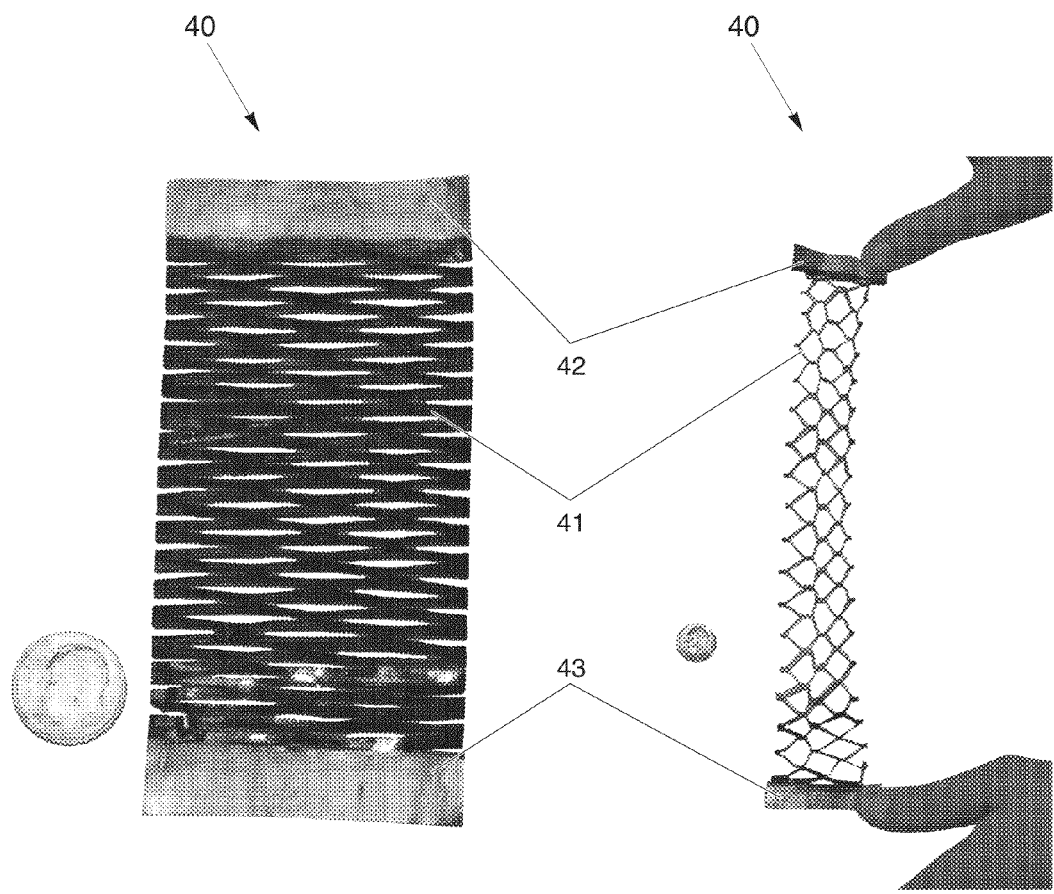
FIGS. 4A-E illustrate an extendible electrically and thermally conductor in accordance with various embodiments of the present invention.

With reference now to FIGS. 4A-B, in accordance with a further embodiment of the present invention, an conductor 40 can be designed to extend or expand in at least one direction, for instance, lengthwise, without compromising or substantially changing the resistivity of the conductor 40. In other words, resistivity or the resistance property of the conductor 40 can be independent of extension or expansion of conductor 40, even if the extension or expansion is to a substantially extreme degree.

Conductor 40, in one embodiment, includes a conducting member 41 made from a conductive nanostructure-based material. Such a material may be a sheet (e.g., woven or non-woven sheet) a plurality of tapes or ribbons made from carbon nanotubes, similar in manner to that disclosed in the '709 Application. Moreover, the material from which the conducting member is made may include, in an embodiment, graphite of any type, for example, such as that from pyrograph fibers.

However, unlike conductor 30 shown in FIG. 3, conducting member 41 of conductor 40 may be imparted or etched with various patterns, including that shown in FIGS. 4A and 4B to permit the conductor 40 to extend or expand, for instance, in a lengthwise direction (i.e., along the X axis) when pulled axially from opposite ends of the conductor 40 (see FIG. 4B). It should be appreciated that in addition to the patterns shown in FIGS. 4A and 4B, the conducting member 41 may include other patterns or designs, so long as such a pattern or design permits extension of conductor 40.

Figures 4C, 4D:
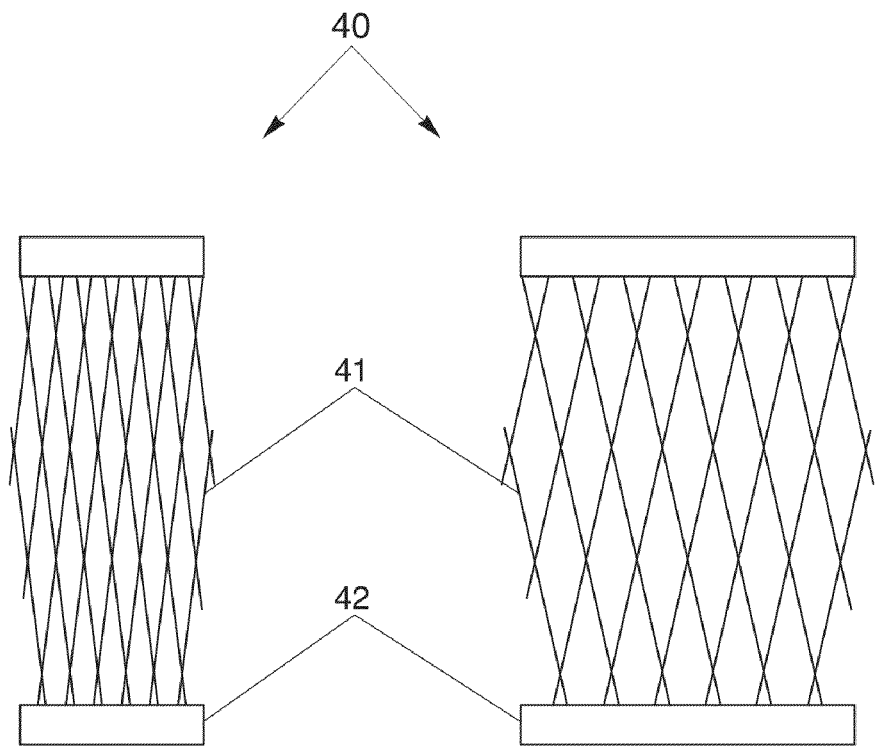

Although shown extending in a lengthwise direction, conductor 40 may also be designed to extend along its width (i.e., along the Y axis). As shown in FIGS. 4C-D, conducting member 41 may be provided with any pattern known in the art that allows the conductor 40 to extend or be extensible along its width. It should be appreciated that conducting member 41 may also include a pattern that allows the conductor 40 to extend lengthwise as well as along its width (i.e., in two dimensions).

Figure 4E:
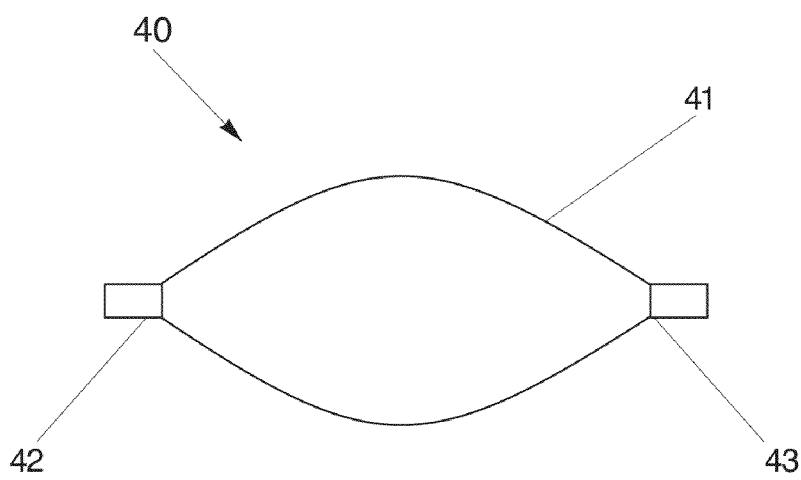

To the extent desired, looking now at FIG. 4E, conductor 40 may include two or more layers of conducting member 41, one on top of the other, and substantially non-bonded to one another, along their length, so that conductor 40 may also be extendible along the Z axis. In such an embodiment, conducting members 41 may be bonded to one another along their respective edges 43. In an embodiment bonding of the edges 43 can be accomplished by the use of a glassy carbon material, such as that provided above.

In addition to being extendible, conducting member 41 may also be provided with shape memory capability. Specifically, the nanotubes from which conducting member 41 may be made can permit the conducting member 41 to retract substantially back to its originally length, width or shape (see FIG. 4A) after the conducting member 41 has been extended (see FIG. 4B) along one, two or three dimensions.

The pattern, design or etching provided on conducting member 41, in an embodiment, may be implement by processes known in the art, include stamping, laser etching etc.

The conductor 40 can also include a connector portion 42 at each of opposing ends of the conducting member 41. In one embodiment of the invention, connector portion 42 may be a coating deposited, such as by electroplating, directly on each end of conducting member 41. Deposition or electroplating of connector portion 42 on to conducting member 41 can be carried out using methods well known in the art. In one embodiment, the connector portion 42 may be made from a metallic material, such as gold, silver, nickel, aluminum, copper, bismuth, tin, zinc, cadmium, tin-nickel alloy, copper alloy, tin-zinc alloy, bismuth-copper alloy, cadmium-nickel alloy, other conductive metals and their alloys, or a combination thereof. The connector portion 42 may also be made from non-metallic material, such as those having glassy carbon forms, or similar materials, so long as the material can be electrically and/or thermally conductive. To the extent that the conductor 40 may be designed to allow conducting member 41 to extend or be extensible along its width, similar to that shown in FIG. 4D, connector portion 42 may also be designed to extend or be extensible widthwise along with the conducting member 41.

In accordance with one embodiment, connector portion 42 may be deposited or electroplated on to conducting member 41 substantially uniformly to permit substantially uniform contact of the nanotubes in conducting member 41 across a contact surface area on the connector portion 42. To that end, the connector portion 42 can act to substantially maximize the number of conductive nanostructures within the conducting member 41 that can be actively involved in conductivity to enhance efficiency of electrical and thermal transport. The conductor 40 of the present invention can be used to enable efficient interaction, for instance, through electrical and/or thermal conduction, between a nanoscale environment and the traditional electrical and/or thermal circuit system, as well as conduction to a standard connector for use in a traditional electrical and/or thermal circuit systems.

Conductors 20, 30 and 40 may be used as current conducting members, including high current conducting members, capacitors, battery electrodes, fuel cell electrodes, as well as for thermal transport, for high frequency transport, and many other applications. With respect to conductor 40, because of its ability to extend, its shape memory capability, as well as its thermal and electrical conductive properties, conductor 40 may be used for a variety of structural and mechanical applications, including those in connection with the aerospace industry, for example, as a conducting member on modern airplane wings that have curved up designs.

Hybrid Conductors

Hybrid conductors capable of achieving enhanced conductivity and current capacity over a wide range of frequencies are disclosed. One method of fabricating such hybrid conductors includes contacting a conductive material (e.g., silver, gold, copper) with a plurality of nanostructures. In some instances, the conductive material enhances electrical and/or thermal conductivity along the plurality of nanostructures. In one embodiment, the plurality of nanostructures is a yarn of nanotubes. In another embodiment, the plurality of nanostructures is a sheet of nanotubes. In some embodiments, the plurality of nanostructures includes nanotubes made from one of carbon, copper, silver, boron, boron-nitride, or a combination thereof. The nanostructures may also include other types of nanotubes disclosed herein. Generally, the contacting involves only a portion of the surface of the plurality of nanostructures. For example, by utilizing a plurality of nanostructures, some portions of the periphery of adjacent nanostructures may not be in physical contact with the conductive material but would instead be in contact with another nanostructure.

In one embodiment, a hybrid conductor can be produced, the hybrid conductor having: a plurality of nanostructures, wherein each nanostructure has a surface area; a member having a geometric profile defined by the plurality of nanostructures; and a conductive material positioned so that it is in contact with less than the total surface area of the plurality of nanostructures, wherein the combination of the conductive material and the plurality of nanostructures enhances conductivity while decreasing resistivity along the length of the member. As used herein, less than the total surface area and the like means not 100%. In some embodiments, the contact between the conductive material and the total surface area of the plurality of nanostructures may be not greater than about 95%, or not greater than about 90%, or not greater than about 85%, or not greater than about 80%, or not greater than about 75%, or not greater than about 70%, or not greater than about 65%, or not greater than about 60%, or not greater than about 55%, or not greater than about 50%. In other embodiments, the conductive material includes one of a conductive coating in contact with less than the total surface area of the plurality of nano structures, a conductive wire in contact with less than the total surface area of the plurality of nanostructures, or a combination thereof. In one embodiment, the member defined by the plurality of nanostructures includes one of a yarn or a sheet. In some embodiments, the member includes one of a plurality of yarns, a plurality of sheets, or a combination thereof.

In one instance, contacting includes intertwining or interweaving two different materials (e.g., a plurality of nanostructures and a copper wire, a plurality of nanostructures and an aluminum wire). In another embodiment, contacting includes coating and/or depositing one material onto another (e.g., electroplating copper onto a plurality of nanostructures, physical vapor depositing copper onto a plurality of nanostructures). In some instances, contacting includes placing or positioning two materials in physical contact. In some embodiments, the contacting may produce a composite or hybrid product.

In one example, carbon nanotubes may be contacted with a copper wire to produce a hybrid conductor. In some embodiments, a yarn of carbon nanotubes may be contacted with a gold wire to produce a composite conductor. In some instances, the carbon nanotubes may be fabricated according to the techniques disclosed in the present application. In one embodiment, a hybrid conductor includes metallic and nanostructure materials. In other embodiments, the hybrid conductor includes non-metallic and nanostructure materials. In some embodiments, the conductive material includes at least one of copper, aluminum, titanium, platinum, nickel, gold, silver, or a combination thereof.

One embodiment discloses a hybrid conductor having a plurality of nanostructures coupled and a conductive material circumferentially deposited about the plurality of nanostructures so as to enhance conductivity along the plurality of nanostructures. In one embodiment, the plurality of nanostructures comprises a yarn of nanotubes. In some embodiments, the nanostructures may be made produced from one of carbon, copper, silver, boron, boron-nitride, MoS2 or similar compounds, or a combination thereof.

In some embodiments, the plurality of nanostructures may be doped in a solution having one of $FeCl_3$, $SbCl_3$, $SbI_3$, $SbF_3$, $SbCl_5$, $Bi(NO_3)_3$, $TeCl_4$, $CuSO_4$, $CuCl_2$, HCl, NaCl, $NaSO_4$, $Fe(NO_3)_3$, hydronium ion, hydrochloric acid, hydrobromic acid, hydrofluoric acid, hydroiodic acid, carbonic acid, sulfuric acid, nitric acid, fluorosulfuric acid, chlorosulfonic acid, methane sulfonic acid, trifluoromethane sulfonic acid, oleum, an agent thereof, or a combination thereof. The doping of nanotubes will become more apparent in subsequent discussion. In other embodiments, the plurality of nanostructures may be doped in a solution having one of fluoride salt, chloride salt, bromide salt, iodate salt, nitrate salt, sulfate salt, or a combination thereof.

In some embodiments, the conductive material may be made from one of copper, aluminum, titanium, platinum, nickel, gold, silver, silver coated copper, cadmium, nickel, tin, bismuth, arsenic, alloys of these metals, boron, boron nitride, glassy carbon, ceramics, silicon, silicon compounds, gallium arsenic, a combination thereof, or other materials capable of being electrically and/or thermally conductive.

In one embodiment, the conductive material may be coated on the plurality of nanostructures. In one instance, coated means covering a first object with a second object. For example, the first object may be a plurality of carbon nanotubes and the second object may be a metallic, semi-metallic or a non-metallic layer. The metallic, semi-metallic or non-metallic layer may partially cover the plurality of carbon nanotubes. In another example, the first object may be a plurality of carbon nanotubes in the form of a wire and the second object may be a copper film that substantially encapsulates the wire. In yet another example, the first object may be a plurality of carbon nanotubes and the second object may be a layer of gold film, which substantially encapsulates the carbon nanotubes. In another embodiment, the plurality of nanostructures may be a sheet of nanotubes coated with a conductive material such as a gold or copper film.

In one embodiment, the conductive material may be deposited on the conductive members. In one instance, deposited means laying down a layer of material on the surface of an object, the material being different than the object. In some embodiments, techniques include electroplating or electroless plating, among others, may be used for depositing the conductive material onto the plurality of nanostructures. In one embodiment, a hybrid conductor may be formed by electroplating a transition metal (e.g., copper) onto a strip of carbon nanotubes. In this instance, the strip of carbon nanotubes may be similar to a bundle or yarn of nanotubes. In one example, the transition metal may be deposited directly on the carbon nanotubes. In another example, a seed layer (e.g., nickel) may be deposited on the strip of carbon nanotubes followed by electroplating of the transition metal material. In another instance, the conductive material may be deposited onto a sheet of nanotubes via electroplating or physical vapor deposition, among other techniques. In some embodiments, the transition metal includes elements and/or alloys of silver, copper, gold, aluminum, titanium, platinum, nickel, or alloys or combinations thereof.

In one embodiment, the hybrid conductor is designed to enable efficient conduction between a nanoscale environment and a traditional electrical and/or thermal circuit system. In another embodiment, the conductive material of the hybrid conductor is capable of enabling relatively high current from a source and carried by the bundle to be directed to an external circuit without substantial degradation.

In some embodiments, the hybrid conductor is designed for use in one of thermal conduction, electrical conduction, EMI applications, high current transmission, RF applications, pulsed applications, thermo-electric and/or power generation, sensor applications, or other similar applications. In other embodiments, the hybrid conductor is designed to enable efficient conduction to a standard connector for use in traditional electrical and/or thermal circuit systems.

In some instances, hybrid conductors may be incorporated as electrical or thermal conductors, among others. In other instances, hybrid conductors include without limitation electrical or optical wires or cables including coaxial cables, cable wires, universal serial bus (USB) cables. In some embodiments, hybrid conductors may include any electrical or thermal conductors requiring high current capacity and conductivity while operating over a wide range of frequencies (e.g., from DC to GHz) and/or a wide range of temperatures (e.g., from about <0° C. to not less than about 200° C.).

In one instance, the conductive member and the conductive material may be placed or positioned in physical contact with one another (e.g., physically interwoven). In one embodiment, the plurality of nanostructures and the conductive material may be physically coupled to each other as to form a geometric pattern. In some embodiments, coupling techniques may include twining, braiding, winding, and plying, to name a few. In one example, twining means twisting together a yarn of carbon nanotubes and the conductive member to form an interwoven pattern. In another example, winding means coiling the conductive member around a sheet of carbon nanotubes, or vice versa, to form a coiled pattern. In yet another example, braiding means twisting together the sheet of carbon nanotubes and the conductive member into a spiral shape. In some instances, the conductive material (e.g., gold or aluminum) may be electroplated onto the yarn or sheet of carbon nanotubes.

In some embodiments, the plurality of nanostructures may be carbon nanotubes in the form of a strip, a wire, a sheet, a yarn, or a combination thereof. In one embodiment, the plurality of nanostructures may be in the form of a strip (e.g., any length or width up to about 2 mm in thickness). In one embodiment, the plurality of nanostructures may be in the form of a wire (e.g., any length and up to about 20 mm in diameter). In some embodiments, the plurality of nanostructures may be in the form of a strip and a wire, two strips, two wires, or any combinations thereof. In another embodiment, the plurality of nanostructures may be a sheet of carbon nanotubes.

In one embodiment, a hybrid wire conductor may be electroplated in a similar fashion to that of a hybrid strip conductor. In another embodiment, a hybrid wire conductor may be produced by plying or braiding several individual strands of carbon nanotubes together with a metal wire (e.g., from about 30 to about 50 AWG). The geometric pattern formed as a result of the braiding can be modified to allow the metal wire to move from the inside to the outside (e.g., similar to a Litz wire as described herein), or as a core conductor with carbon nanotubes wrapping around the core conductor. This will become more apparent in subsequent figures and discussion.

In one embodiment, carbon nanotubes may undergo treatment to enhance conductivity and productivity of the carbon nanotubes. In these instances, the carbon nanotubes may be one of sheet, strip, wire, yarn, or combinations thereof. For carbon nanotube sheets, enhanced conductivity and productivity may result from a treatment process. Likewise, if nanotube strips are generated, the strips may also undergo a treatment processes to enhance conductivity and productivity of the nanotubes in the strip. Treatment of a composite sheet after formation may, in an embodiment, include subjecting the composite sheet to a protonation agent. One feature of the protonation agent may be to bring the carbon nanotubes in closer proximity with one another. By bringing the carbon nanotubes closer together, the protonation agent may act to reduce surface tension, reduce resistivity, and increase conductivity of the sheet.

Examples of a protonation agent may include an acid such as hydronium ion, hydrochloric acid, hydrobromic acid, hydrofluoric acid, hydroiodic acid, carbonic acid, sulfuric acid, nitric acid, fluorosulfuric acid, chlorosulfonic acid, methane sulfonic acid, trifluoromethane sulfonic acid, oleum, an agent thereof, or a combination thereof, or other materials capable of being electrically and/or thermally conductive. In other embodiments, the plurality of nanostructures may be doped in a solution having one of fluoride salt, chloride salt, bromide salt, iodate salt, nitrate salt, sulfate salt, or a combination thereof. In these embodiments, doping includes immersing and/or submerging the nanostructures in a solution for a predetermined temperature and time. Although the doping is performed on sheet of carbon nanotubes, the doping process may also be performed on yarns and strips of carbon nanotubes, among others.

In some embodiments, the solution may include a solvent, a polymer, a metal, or a combination thereof. The solvent used in connection with the solution of the present invention can be used to lubricate the sheet in order to gain better alignment and enhancement in the properties of the carbon nanotubes. Examples of a solvent that can be used in connection with the solution include toluene, kerosene, benzene, hexanes, any alcohol including but not limited to ethanol, methanol, butanol, isopropanol, as well as tetrahydrofuran, 1-methyl-2-pyrrolidinone, dimethyl formamide, methylene chloride, acetone or any other solvent as the present invention is not intended to be limited in this manner. In an embodiment, the solvent may be used as a carrier for a polymer, monomer, inorganic salt, or metal oxide to.

Examples of a polymer that can be used in connection with the solution include a small molecule or polymer matrix (thermoset or thermoplastic) including, but not limited to, polyurethane, polyethylene, poly(styrene butadiene), polychloroprene, poly(vinyl alcohol), poly(vinyl pyrrolidone), poly(acrylonitrile-co-butadiene-co-styrene), epoxy, polyureasilazane, bismaleimide, polyamide, polyimide, polycarbonate, or any monomer including styrene, divinyl benzene, methyl acrylate, and tert-butyl acrylate. In an embodiment, the polymer may include polymer particles, that are difficult to obtain in liquid form.

Examples of a metal that can be used in connection with the solution include a salt (any transition metal, alkali metal, or alkali earth metal salt or mixture thereof including, but not limited to, nickel hydroxide, cadmium hydroxide, nickel chloride, copper chloride, calcium zincate ($CaZn_2(OH)_6$)), or metal oxide (any transition metal, alkali metal, or alkali earth metal oxide or mixture thereof, including but not limited to: zinc oxide, iron oxide, silver oxide, copper oxide, manganese oxide, $LiCoO_2$, $LiNiO_2$, $LiNi_xCO_{1-x}O_2$, $LiMn_2O_4$). In an embodiment, the metal may include polymers or volatile solvents to create a carbon nanotube metal matrix composite. Examples of such polymers or volatile solvents include powdered forms of aluminum or its alloys, nickel, superalloys, copper, silver, tin, cobalt, iron, iron alloys, or any element that can be produced in a powdered form including complex binary and ternary alloys or even superconductors.

Another embodiment discloses contacting a conductive wire with a portion of the surface of the conductive material and the plurality of nanostructures. In some embodiments, the conductive wire maybe copper, aluminum, titanium, nickel, gold, silver, or a combination thereof. For example, a copper wire may be intertwined with the hybrid conductive material and nanostructures. In this instance, the copper wire may help to enhance conductivity (e.g., electrical, thermal) of the plurality of nanostructures similar to those described above. In one embodiment, a sheet of carbon nanotubes may be contacted with a conductive material such as a copper film. The hybrid sheet of copper and carbon nanotubes may then be contacted with a plurality of aluminum wires for enhanced conductivity (e.g., electrical, thermal) of the hybrid sheet of carbon nanotubes. A plurality of these hybrid sheets or various combinations thereof may be placed adjacent one another to provide an enhanced hybrid conductor.

Another embodiment discloses a hybrid conductor having a plurality of nanostructures, whereby the plurality of nanostructures may be doped for increased conductivity. In some embodiments, the nanostructures may be immersed in a solution including one of $FeCl_3$, $SbCl_3$, $SbI_3$, $SbF_3$, $SbCl_5$, $Bi(NO_3)_3$, $TeCl_4$, $CuSO_4$, $CuCl_2$, $Fe(NO_3)_3$, or combinations thereof. In other embodiments, the nanostructures may be immersed in a solution including one of chloride salts (e.g., HCl, NaCl, $CuCl_2$), nitrate salts (e.g., $Bi(NO_3)_3$), sulfate salts (e.g., $CuSO_4$, $NaSO_4$), or combinations thereof. The doping may be p-type, n-type, cathodic, anodic, or combinations thereof. In one instance, the doping may be carried out in conjunction with the deposition and/or coating techniques disclosed herein. In other instances, the doping may be carried out by itself in fabricating the hybrid conductor. In other embodiments, the solution may include those described herein.

In some instances, the doping or immersion solution may be prepared by mixing about 10 wt. % solutions of the salts disclosed herein in a solvent or mixture of solvents (e.g., water, acetone, ethanol, toluene), and immersing (e.g., soaking) the carbon nanotubes in the solution for about one hour. For example, a plurality of carbon nanotubes may be doped in a $CuSO_4$ solution by soaking or immersing them in a $CuSO_4$ solution for a predetermined amount of time and at a predetermined temperature. The immersed samples may be dried at about 120° C. for about one hour to produce the doped carbon nanotubes. As discussed, the doping may be carried out with or without the contacting step (e.g., deposition and/or coating techniques). In some embodiments, different concentration of solutions may be utilized. For example, the carbon nanotubes may be doped in about 50 wt. % nitric acid solution for not less than about 5 seconds. In other instances, the carbon nanotubes may be doped in about 40 wt. % salt solution, or about 30 wt. % salt solution, or at least about 10 wt. % salt solution, or not greater than about 90 wt. % salt solution. In some embodiments, the soaking or immersion time may be at least about 5 seconds, or at least about 10 seconds, or at least about 30 seconds, or at least about 1 minute, or not greater than 10 minutes, or not greater than 5 minutes.

Additional details on doping carbon nanotubes are provided in U.S. patent application Ser. No. 12/437,538 filed May 7, 2009, which is hereby incorporated herein by reference in its entirety. The method includes, among others, a nanostructured sheet having a substantially planar body, a plurality of nanotubes defining a matrix within the body, and a protonation agent dispersed throughout the matrix of nanotubes for enhancing proximity of adjacent nanotubes to one another. Such an approach, in an embodiment, can employ any known protocols available in the art, and can be incorporated into a fabrication process of the present invention.

Another method for doping carbon nanotubes (CNTs) is provided in U.S. patent application Ser. No. 12/191,765 filed Aug. 14, 2008, published Feb. 19, 2009 as U.S. Patent Application No. 20090044848, which is hereby incorporated herein by reference in its entirety. The method includes, among other things, reducing resistivity and increasing conductivity of the nanotube sheets or yarns by introducing trace amounts of foreign atoms (e.g., doping) during the nanotube growth process. The method also includes doping nanotube thermal element with one of a p-type dopant, n-type dopant, or both. Such an approach, in an embodiment, can employ any known protocols available in the art, and can be incorporated into a growth process of the present invention.

Yet another method for doping carbon nanotubes (CNTs) is provided in U.S. patent application Ser. No. 12/437,535 filed May 7, 2009, which is hereby incorporated herein by reference in its entirety.

In some embodiments, carbon nanotube conductors (e.g., with or without doping) having electroplated metal may be placed in parallel operation with carbon nanotube conductors without any doping and without any electroplated metal for maximizing conductivity over an entire range of frequency from DC to GHz (e.g., from about 50 Hz up to about 200 MHz). In other embodiments, carbon nanotube conductors (e.g., with or without doping) without electroplated metal may be placed in parallel operation with carbon nanotube conductors without any doping and without any electroplated metal for maximizing conductivity over a range of frequency. In yet other embodiments, combinations thereof (e.g., carbon nanotube conductors without doping, carbon nanotube conductors with doping, electroplated carbon nanotube conductors without doping, electroplated carbon nanotube conductors with doping) may be incorporated. In some instances, conductors may be operated in series with other conductors. In other instances, the conductor combinations may include transitional metal wires (e.g., copper wire, aluminum wire). For example, a carbon nanotube strip may be braided or plied with a copper wire, or two gold wires, or combinations thereof. In other examples, two carbon nanotube wires may be braided or plied with a gold wire, or two copper wires, or combinations thereof.

In some instances, electrons may travel through the metal portion or the conductive member (e.g., metal wire) of a conductor at lower frequencies, and move to the carbon nanotube portion when operating at higher frequencies (e.g., above MHz). Therefore, weight savings may be realized at lower frequencies by incorporating the conductive member or metal wire, while the capacitive coupling behavior of carbon nanotubes are realized at higher frequencies.

EXAMPLES

Figure 5A:
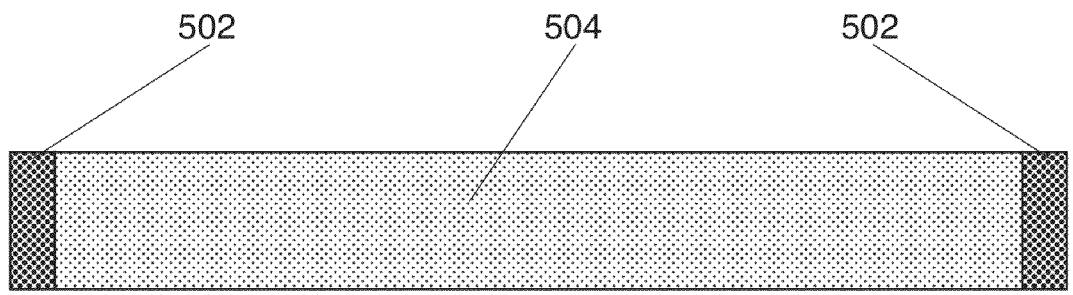
FIGS. 5A-C illustrate top-schematic view, side-schematic view, and actual top-down view of a metal-carbon nanotube hybrid conductor.
Figure 5B:
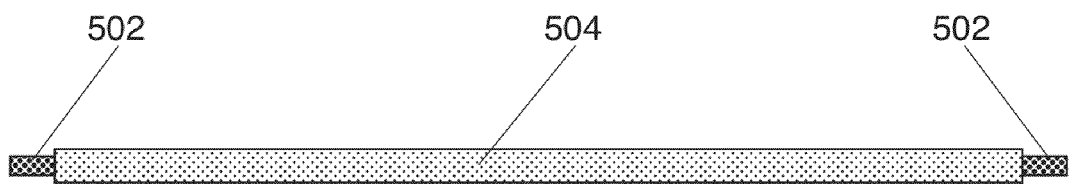
Figure 5C:
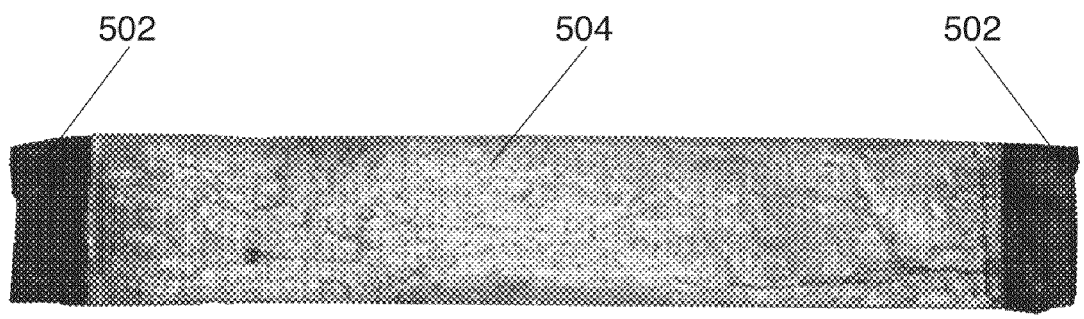

Reference is now made to FIGS. 5A-5C illustrating a top-schematic view, side-schematic view, and actual top-down view of a carbon nanotube strip 502 coated with copper 504. In this sample 500, a thin layer of nickel (not visible) was electrodeposited on both sides of the carbon nanotube strip 502 followed by a thicker layer of copper 504, whereby the thickness of the copper metal 504 on either side of the strip 502 is about 20 microns.

This sample 500, along with other similar samples, were subsequently tested for resistance as a function of frequency and current capacity at a maximum temperature of about 300° C. As illustrated in Table 2 below, measurements of thickness, current and current capacity were carried out on five different samples. The raw samples (raw 1, raw 2 and raw 3) were coated with copper on the ends of the strips to reduce contact resistance. As shown by the results, the copper coated samples (copper coated 1 and copper coated 2) may achieve higher current capacities if the temperature may be increased up to about 300° C. with higher current.

TABLE 2

(† system limited to 25 A)

| Sample | Current | Temperature | Current Capacity |
|---|---|---|---|
| Raw 1 (47 microns thick) | 5.52 A | 300° C. | $4.7 \times 10^6 A/m^2$ |
| Raw 2 (73 microns thick) | 7.51 A | 300° C. | $4.1 \times 10^6 A/m^2$ |
| Raw 3 (34 microns thick) | 4.51 A | 342.5° C. | $5.3 \times 10^6 A/m^2$ |
| Copper Coated 1 (74 microns thick) | 25 A | 57.2° C. | $13.5 \times 10^6 A/m^2$† |
| Copper Coated 2 (89 microns thick) | 25 A | 31.3° C. | $11.2 \times 10^6 A/m^2$† |

Figure 6:
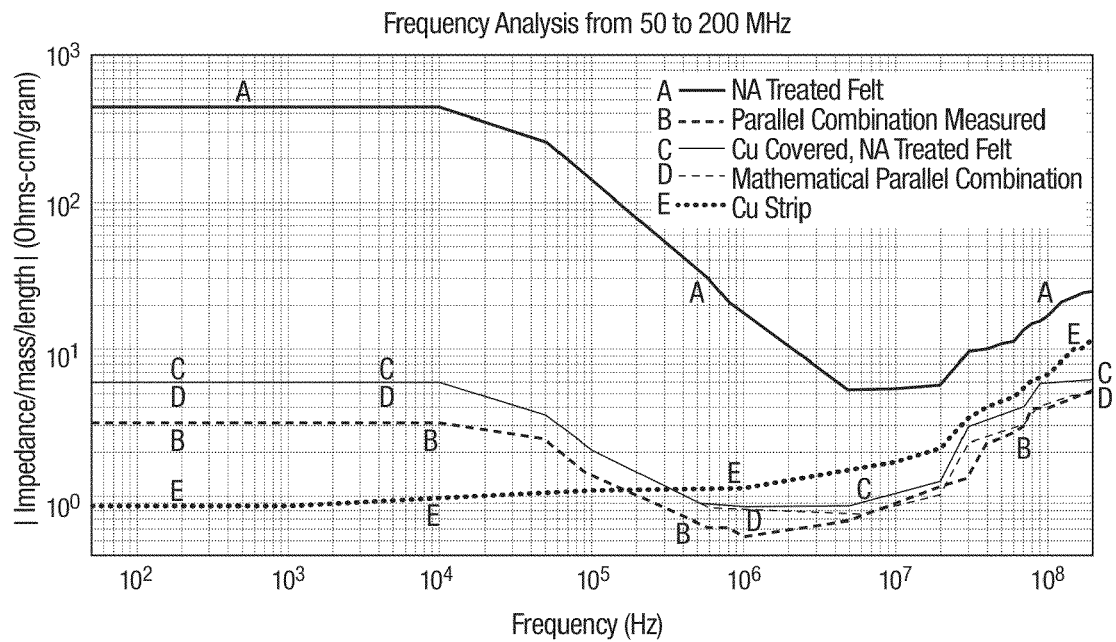
FIG. 6 illustrates measured frequency analysis response of various metal-carbon nanotube hybrid conductors.

The copper coated samples were also tested for resistance as a function of frequency from DC to about 200 MHz. Reference is now made to FIG. 6 illustrating resistance per linear density as a function of frequency for a condensed carbon nanotube ribbon conductor (A), a copper coated carbon nanotube ribbon conductor (C), and a parallel combination of the two (B) versus a pure copper strip reference sample (E).

The condensed carbon nanotube ribbon conductor (A) has a length of about 10 cm, width of about 0.9 cm, thickness of about 28 microns, and a mass of about 0.03564 gram. The copper coated nanotube ribbon conductor (C) has a length of about 9.8 cm, width of about 1 cm, thickness of about 106 microns, and a mass of about 0.11465 gram. The copper strip reference sample (E) has a length of about 18.3 cm, width of about 3.3 mm, thickness of about 50 microns, and a mass of about 0.29703 gram.

As shown, the measured frequency response of the resistance, taking mass and size into account, of a raw (e.g., uncoated or untreated) copper nanotube strip (A) shows roll-off behavior at around about 10 KHz, which may be attributed to capacitive coupling, and continues to exhibit a decrease in resistance until at about 30 MHz, where it then begins to increase. In contrast, copper coated hybrid samples (B, C) were able to mimic that of a copper strip (E) until the roll-off point at which time it becomes less restrictive (e.g., more conductive) than the copper strip (E) for the rest of the measurement up to about 200 MHz.

Figure 7:
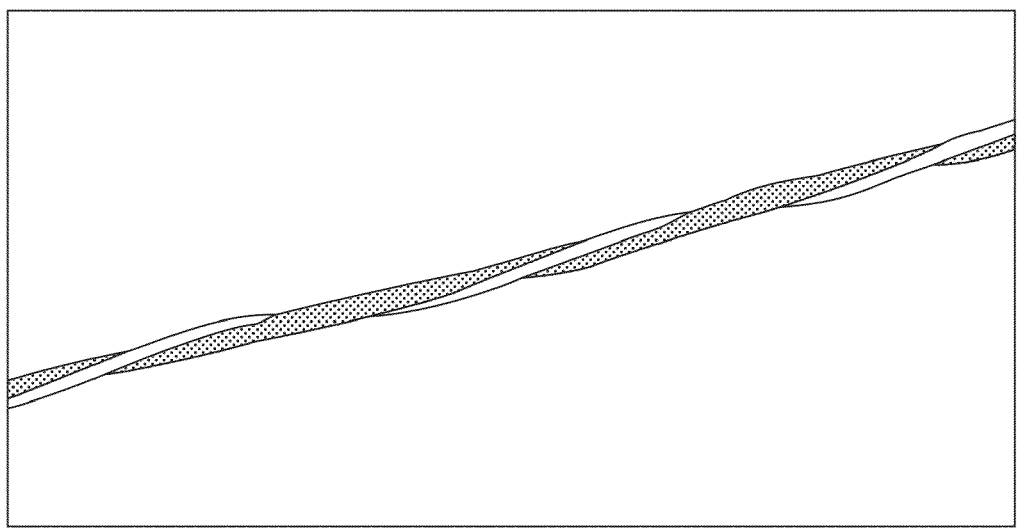
FIG. 7 is an image of a conductor having 6-ply carbon nanotube and a 1-ply 40 AWG bare copper wire.

Reference is now made to FIG. 7 showing a carbon nanotube wire plied with an approximately 40 AWG bare copper wire. In this example, a conductor is composed of six carbon nanotube wires coupled to one copper wire. In this instance, the performance may be similar to that of a copper coated carbon nanotube strip conductor as disclosed above, but with a different geometric pattern.

Figure 8:
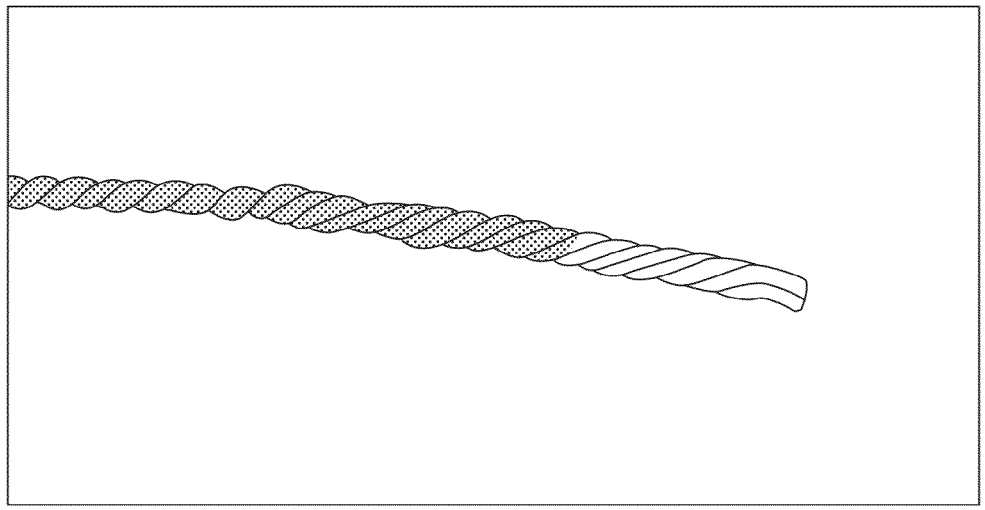
FIG. 8 is an image of a conductor having a bare 150-ply carbon nanotube wire conductor coated with copper on one end of the wire conductor.

Reference is now made to FIG. 8 showing a conductor including a copper coated carbon nanotube wire. In this example, a 150-ply carbon nanotube wire has been coated with copper on the ends of the wire.

Figure 9:
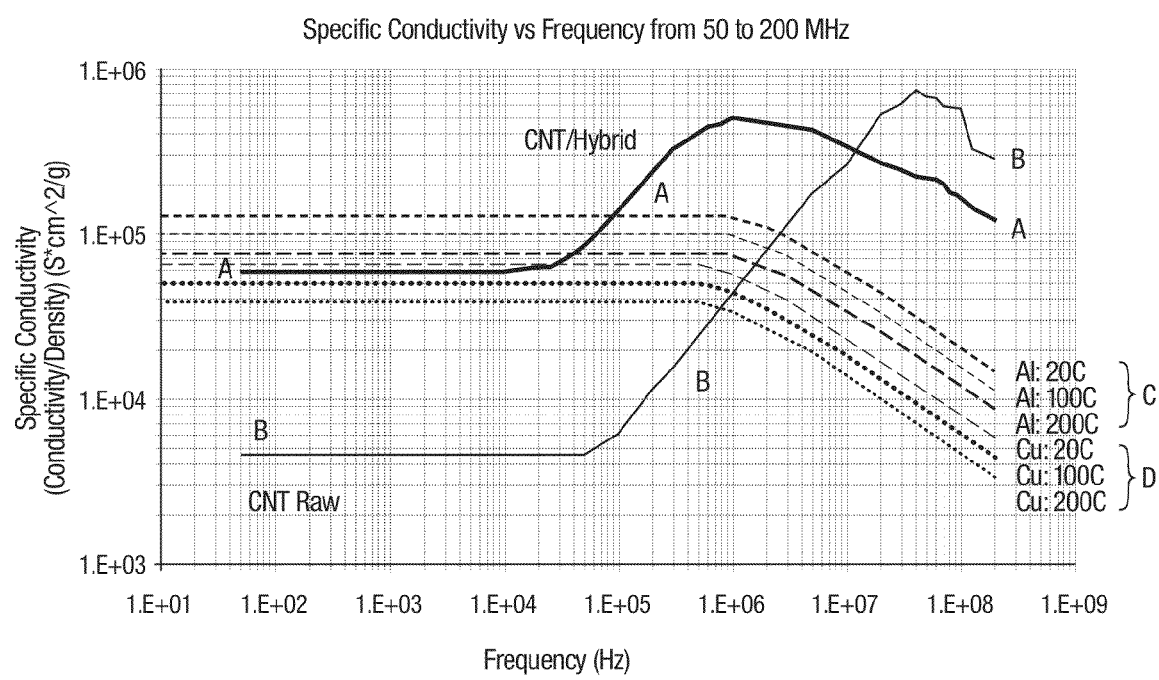
FIG. 9 illustrates measured frequency analysis response of a copper-carbon nanotube hybrid conductor, a carbon nanotube conductor, and aluminum and copper wires at various temperatures.

Reference is now made to FIG. 9 illustrating measured frequency analysis response from about 50 Hz to about 200 MHz of a copper-carbon nanotube hybrid conductor (A), a carbon nanotube conductor (B), and aluminum (C) and copper (D) wires at various temperatures. All the samples in the figure have the same cross-sectional area and the specific conductivity is a measure of conductivity divided by material density.

As shown, aluminum (C) and copper (D) samples experience decreases in specific conductivities with increasing frequency across all temperatures. The drop-off for the metal samples appear to begin at about 1 MHz. In addition, the metal samples also seem to exhibit decreases in specific conductivities with increasing temperatures at each and every frequencies tested. For example, the specific conductivity of aluminum at 20° C. is slightly higher than that of aluminum at 100° C., which is slightly higher than that of aluminum at 200° C. This is evident across all frequencies tested. Similar trend may also be said for copper.

In contrast, the un-coated or un-treated carbon nanotube (B), having lower specific conductivity than the metal samples at lower frequencies (less than about 100 KHz), appears to exhibit an increase in specific conductivity over metal samples beginning at about 3 MHz and continues at higher frequencies. Likewise, the copper-carbon nanotube hybrid conductor (A), having lower specific conductivity than aluminum at 20° C. at lower frequencies (less than about 100 KHz), also appears to exhibit increasing specific conductivity with increasing frequency starting at about 100 KHz and continues at higher frequencies. Furthermore, the copper-carbon nanotube hybrid conductor (A) appears to exhibit higher specific conductivities than copper wires (D) at both 100° C. and 200° C. across all frequencies. This seems to suggest that hybrid conductors as disclosed herein may outperform copper or other metal wires at higher temperatures across all frequencies. In some embodiments, the hybrid conductors may be frequency independent. In other embodiments, the hybrid conductors are capable of achieving better performance than metal wires at frequencies of at least about 1 KHz, or at least about 10 KHz, or at least about 100 KHz, or at least about 1 MHz, or at least about 10 MHz, or at least about 100 MHz, or at least about 1 GHz, or at least about 2 GHz, or at least about 5 GHz, or at least about 10 GHz. In some embodiments, the hybrid conductors may achieve better performance than copper or aluminum wires at a wide range of frequency, or over an entire range of frequency, or over all frequencies, or independent of frequency, or a combination thereof. Similarly, the hybrid conductors may achieve these performances at various temperatures and across all temperature ranges.

Although the carbon nanotube materials (A, B) are tested at ambient temperature (about 20° C.), similar performance would have been observed at elevated temperatures (e.g., 100° C. or 200° C.) because the material properties of carbon nanotubes are not as temperature sensitive.

Figure 10:
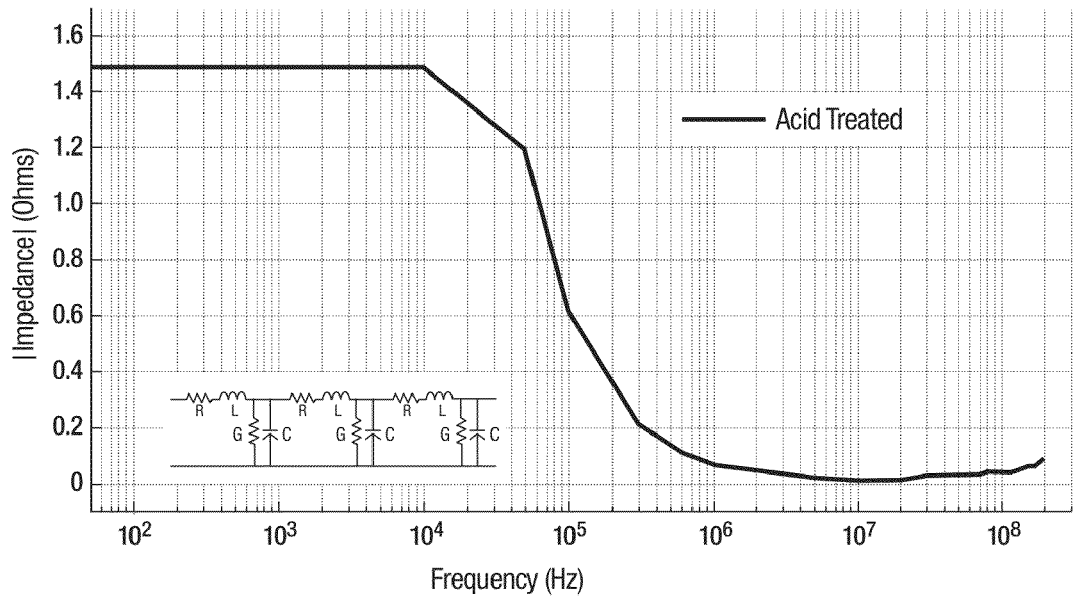
FIG. 10 illustrates measured frequency analysis response of an acid-treated carbon-nanotube hybrid conductor.

Reference is now made to FIG. 10 illustrating measured frequency analysis response from about 50 Hz to about 200 MHz of an acid-treated carbon-nanotube sheet hybrid conductor. In this instance, the acid-treated carbon-nanotube hybrid conductor was treated in approximately 50 wt. % nitric acid solution at ambient temperature (e.g., 20° C.) for at least about 5 seconds. The acid-treated carbon-nanotube hybrid conductor appears to exhibit decreasing impedance with increasing frequency. Specifically, the fall-off in impedance begins at about 10 KHz and continues with increasing frequencies and appears to taper out at about 1 MHz. This may be an indication that the hybrid conductor may provide enhanced performance (lower impedance) at higher frequencies. Although this hybrid conductor is in sheet form, it is also possible to produce the hybrid conductor in any format disclosed herein.

Figure 11:
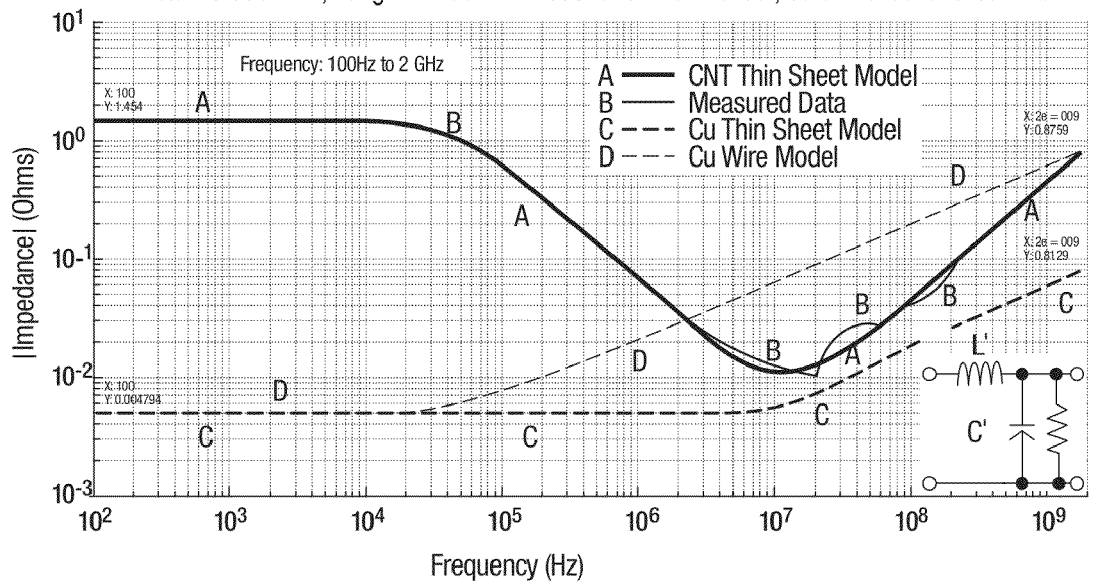
FIG. 11 illustrates modeled and measured frequency analysis responses of an acid-treated carbon-nanotube hybrid conductor, a copper wire and a copper sheet.

Reference is now made to FIG. 11 illustrating frequency analysis responses of a modeled acid-treated carbon-nanotube hybrid conductor (A), a measured acid-treated carbon-nanotube hybrid conductor (B), a modeled copper sheet (C) and a modeled copper wire (D). The copper sheet (C) and wire (D) have the same cross sectional area as the hybrid conductor (A, B). As shown, the modeled copper sheet (C) and wire (D) exhibited similar impedance trends with increasing impedance starting around 20 KHz and continuing beyond 1 GHz, with the copper wire (D) exhibiting slightly an order of magnitude higher impedance than the copper sheet (C). In contrast, the carbon nanotube, both modeled (A) and measured (B), exhibited similar trends with decreasing impedance between about 20 KHz to about 10 MHz. From about 10 MHz up to about 1 GHz, the impedance started to increase, which is most likely due to skin effect. In addition, the measured hybrid conductor (B) exhibited substantially similar impedance to that of the modeled hybrid conductor (A) at all frequencies.

Figure 12:
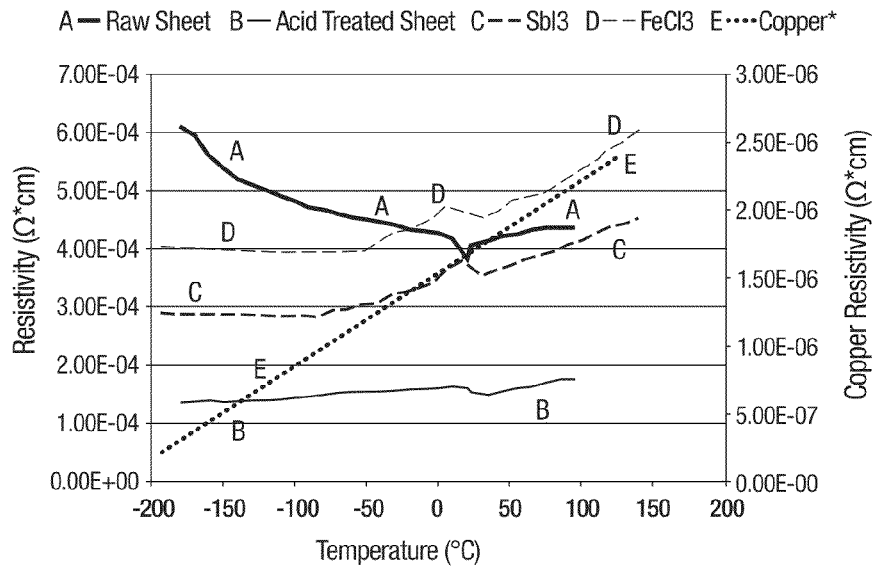
FIG. 12 illustrates temperature dependent resistivity of an acid-treated carbon-nanotube hybrid conductor, an untreated carbon nanotube, $SbI_3$, $FeCl_3$, and copper.

Reference is now made to FIG. 12 illustrating temperature dependent resistivity of an untreated carbon nanotube (A), an acid-treated carbon-nanotube hybrid conductor (B), $SbI_3$ (C), $FeCl_3$ (D), and copper (E). As shown, the acid-treated carbon-nanotube hybrid conductor (B) exhibited minimal variations in resistivity (at about 0.15 m Ω-cm) across a wide range of temperatures (from about −200° C. to about 100° C.), whereas $SbI_3$ (C, from about 0.28 m Ω-cm to about 0.45 Ω-cm), $FeCl_3$ (D, from about 0.40 Ω-cm to about 0.60 Ω-cm), and copper (E, from about 0.2 μΩ-cm to about 2.5 μΩ-cm) all exhibited increasing resistivity with increasing temperatures (from about −200° C. to about 100° C.). It may be inferred from this data that carbon nanotubes generally do not change resistivity with increasing temperature whereas copper and other metallic materials do.

Figure 13:
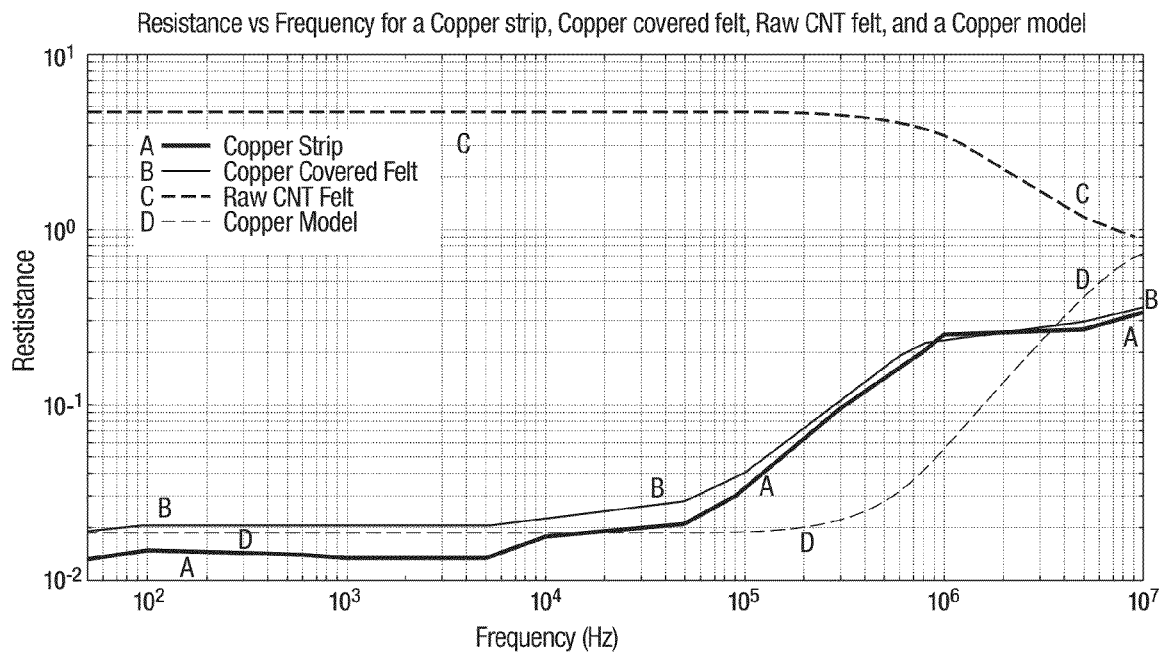
FIG. 13 illustrates modeled and measured resistance versus frequency response of a copper-coated carbon-nanotube hybrid conductor, an uncoated carbon nanotube, and a copper strip.

Reference is now made to FIG. 13 illustrating resistance versus frequency response of a copper strip (A), a copper-coated carbon-nanotube hybrid conductor (B), an uncoated carbon nanotube (C), and a modeled copper strip (D). In these examples, the copper strip (A) weighs about 4.9 times that of the copper-coated carbon-nanotube hybrid conductor (B). As shown, the copper-coated carbon nanotube hybrid conductor (B) is capable of reaching a resistance (at about 0.7 ohms) close to that of the uncoated carbon nanotube (C) near high frequencies (at about 10 MHz), but will generally not exceed the resistance of the uncoated carbon nanotube (C). In contrast, the resistance of the copper strip (A) will continue and eventually exceed those of the uncoated carbon nanotube (C). Furthermore, the copper-coated carbon nanotube hybrid conductor (B) is capable of exhibiting substantially similar resistance as that of the measured copper strip (A) and modeled copper strip (D), but has a dramatic density advantage. This will become more apparent in subsequent discussions.

Figure 14:
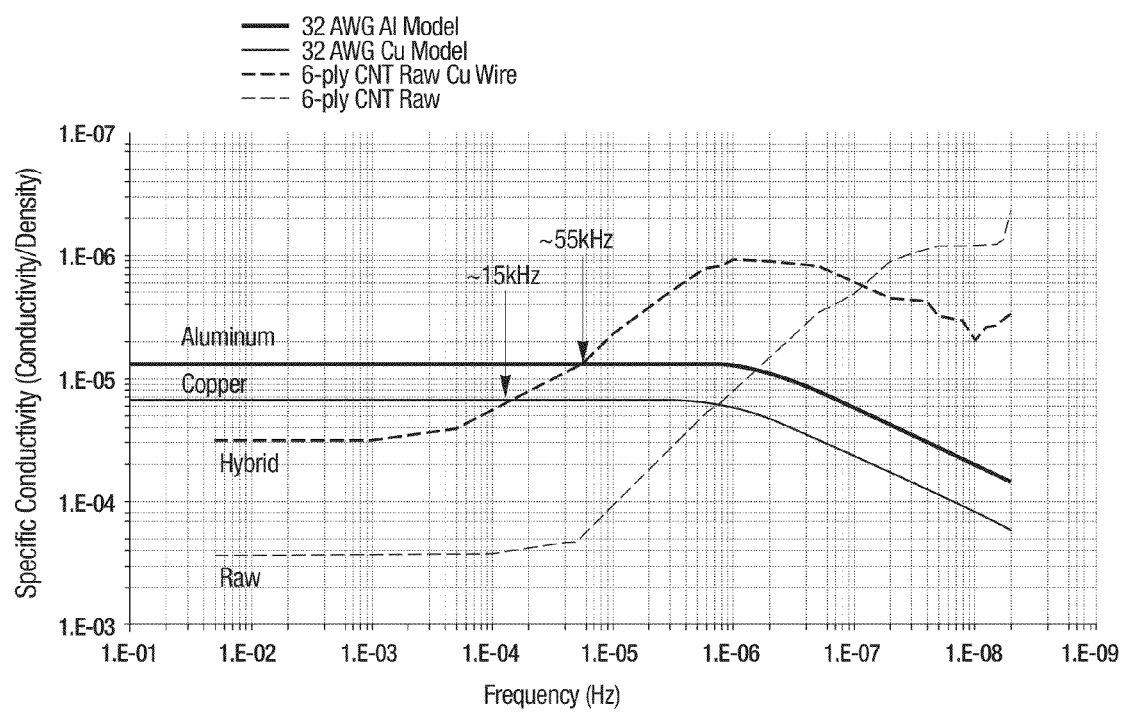
FIG. 14 illustrates specific conductivity of a copper-coated carbon-nanotube hybrid conductor, an uncoated carbon nanotube, and aluminum and copper strips.

Reference is now made to FIG. 14 illustrating specific conductivity of a modeled 32 AWG aluminum strip, a modeled 32 AWG copper strip, a 6-ply copper-coated carbon-nanotube hybrid conductor (hybrid), and an uncoated carbon nanotube (raw). As shown, the hybrid conductor (hybrid) is capable of exhibiting specific conductivity similar to that of aluminum and copper at lower frequencies (about 50 Hz to about 2 KHz), but is off by about an order of magnitude. Likewise, the uncoated carbon nanotube (raw) also has lower specific conductivity at lower frequencies but is about two orders of magnitude off aluminum and copper. At higher frequencies, however, both the hybrid conductor (hybrid) and the uncoated carbon nanotube (raw) are able to exhibit higher specific conductivities than that of aluminum and copper. Specifically, the cross-over is at about 15 KHz for the hybrid conductor over copper and at about 55 KHz for the hybrid conductor over aluminum. Likewise, the cross-over is at about 800 KHz for uncoated carbon nanotube over copper and at about 15 MHz for the uncoated carbon nanotube over aluminum.

In one embodiment, about 9% of the weight of a M17-RG400 single conductor coaxial cable may be attributed to a copper conductor (internal copper wire), followed by about 21% to the internal insulation, about 50% to the copper shield or mesh, rounded out by about 20% to the exterior or outside insulation. In contrast, about 1% of the weight of a carbon-nanotube hybrid conductor may be attributed to the carbon-nanotube conductor, followed by about 43% to the inner insulation, about 4% to the carbon-nanotube shielding, rounded out by about 52% to the outside or other insulation. In these instances, by substituting the carbon-nanotube shielding in place of the copper shield or mesh for a M17-RG400 single conductor coaxial cable may result in approximately 46% weight savings (about 50% reduced to about 4%).

In another embodiment, about 38% of the weight of a M27500 twisted pair shielded cable may be attributed to a copper conductor (e.g., silver-plated copper or alloy), along with about 17% to the inner insulation (e.g., ePTFE), about 25% to the copper shielding (e.g., braided silver-plated wire), with about 20% to other insulation (e.g., PTFE over ePTFE). In contrast, about 6% of the weight of a carbon-nanotube hybrid conductor may be attributed to the carbon-nanotube conductor, about 32% to the inner insulation, about 5% to the carbon-nanotube shielding, and about 57% to the outside or other insulation. In these instances, by substituting the carbon-nanotube shielding in place of the copper shielding may result in approximately 20% weight savings (about 25% reduced to about 5%).

Applications

The production of hybrid conductors and other hybrid nanostructure conductors enable applications that utilize their extraordinary mechanical and electronic properties. The hybrid conductors and hybrid nanostructure conductors produced by the systems and methods of the present invention can be woven or assembled into a fibrous material and treated for use in connection with various applications, including heat sinks, electric power transmission lines which require strength and conductivity, electric motor and solenoid windings which require low resistivity and minimum eddy current loss, high strength fiber-reinforced composites including carbon-carbon and carbon-epoxy, and hybrid nanotube-based cables, fibers, tows, textiles, and fabrics. Also included are devices made from these hybrid nanotubes and nanostructures and conductors, and textiles such as armor of various types, protective clothing, energy-generating tethers and the like. The present invention also contemplates coating hybrid nanotubes or groups of nanotubes with either a thermoset epoxy or a high-carbon polymer, such as furfuryl alcohol or RESOL to act as a composite precursor.

Structures formed from carbon have been discussed herein. However, it should be recognized that nanostructures, including nanotubes, can be formed from other materials, including for example, boron nitride, tungsten sulfide, vanadium oxide, and boron carbon nitride using catalytic processes similar to that described above. Accordingly, the present invention also includes hybrid conductors and other hybrid nanostructure conductors and prismatic nanostructures formed from inorganic materials such as vanadium oxide and boron nitride, and from carbon in combination with other elements, such as boron carbon nitride. In one embodiment, the present invention includes the process for making related hybrid nanostructured materials and the structural, thermal, and electrical applications described above.

In one embodiment, a low eddy current, low resistance winding for a high frequency solenoid may be produced incorporating an embodiment of a hybrid conductor as disclosed herein. In another embodiment, a winding for a high frequency transformer may be produced incorporating an embodiment of a hybrid conductor as disclosed herein. In some embodiments, a heat conductor, a low eddy current, low resistance winding for an electric motor, and a low eddy current, low resistance winding for a solenoid, each capable of incorporating an embodiment of a hybrid conductor as disclosed herein, may all be produced.

In some embodiments, the hybrid conductor embodiments disclosed herein may be incorporated as windings in solenoid form or for generators and motors. Because nanostructures may be utilized, the hybrid conductors may be more efficient electrically because their properties do not substantially change with temperature. Furthermore, the nanostructure hybrid conductors may help to minimize eddy currents allowing high speed or high frequency solenoid windings to be incorporated in fuel injection systems, among other electrical and thermal systems.

It will be appreciated by one skilled in the art that the weight and/or density savings of the carbon-nanotube hybrid conductors may be applied to other conventional electrical and/or thermal conductors including without limitation electrical wires, fiberoptics, cable wires, among others.

While the present invention has been described with reference to certain embodiments thereof, it should be understood by those skilled in the art that various changes may be made and equivalents may be substituted without departing from the true spirit and scope of the invention. In addition, many modifications may be made to adapt to a particular situation, indication, material and composition of matter, process step or steps, without departing from the spirit and scope of the present invention. All such modifications are intended to be within the scope of the claims appended hereto.

What is claimed is:

1. A hybrid conductor comprising:
 a plurality of nanostructures, each having a surface area;
 a member having a geometric profile defined by the plurality of nanostructures, the member having a first end, a second end and a length between the ends; and
 a continuously-extending conductive material circumferentially positioned about the member for substantially the entire length of the member,
 wherein the continuous conductive material is in contact with less than the total surface area of the plurality of nanostructures, wherein the combination of the conductive material and the plurality of nanostructures enhances conductivity while decreasing resistivity along the length of the member.

2. The hybrid conductor as set forth in claim 1, wherein the nanostructures are made from one of carbon, copper, silver, boron, boron-nitride, or a combination thereof.

3. The hybrid conductor as set forth in claim 1, wherein the plurality of nanostructures are doped in a solution having one of fluoride salt, chloride salt, bromide salt, iodate salt, nitrate salt, sulfate salt, or a combination thereof.

4. The hybrid conductor as set forth in claim 1, wherein the member defined by the plurality of nanostructures includes one of a yarn or a sheet.

5. The hybrid conductor as set forth in claim 4, wherein the member includes one of a plurality of yarns, a plurality of sheets, or a combination thereof.

6. The hybrid conductor as set forth in claim 1, wherein the conductive material includes one of a conductive coating in contact with less than the total surface area of the plurality of nanostructures, a conductive wire in contact with less than the total surface area of the plurality of nanostructures, or a combination thereof.

7. The hybrid conductor as set forth in claim 6, wherein the conductive material comprises one of copper, aluminum, titanium, platinum, nickel, gold, silver, or a combination thereof.

8. A heat conductor comprising the hybrid conductor as set forth in claim 1.

9. A low eddy current, low resistance winding for an electric motor comprising the hybrid conductor as set forth in claim 1.

10. A low eddy current, low resistance winding for a solenoid comprising the hybrid conductor as set forth in claim 1.

11. The hybrid conductor as set forth in claim 1, wherein the conductive material is a conductive wire plied with the plurality of nano structures.

12. A hybrid conductor comprising:
a plurality of nanostructures, wherein the plurality of nanostructures are doped in a solution having one of fluoride salt, chloride salt, bromide salt, iodate salt, nitrate salt, sulfate salt, or a combination thereof;
a protonation agent in contact with the plurality of nanostructures; and
a member having a geometric profile defined by the plurality of nanostructures, wherein the plurality of nanostructures enhances conductivity while decreasing resistivity along the length of the member.

13. The hybrid conductor as set forth in claim 12, wherein the member defined by the plurality of nanostructures includes one of a yarn or a sheet.

14. The hybrid conductor as set forth in claim 13, wherein the member includes one of a plurality of yarns, a plurality of sheets, or a combination thereof.

15. A method comprising:
providing a plurality of nanostructures, each having a surface area;
generating a member having a geometric profile defined by the plurality of nanostructures and having a first end and a second end and a length between the ends; and
positioning a continuously-extending conductive material circumferentially about the member for substantially the entire length of the member, wherein the continuous conductive material is in contact with less than the total surface area of the plurality of nanostructures, wherein the combination of the conductive material and the plurality of nanostructures enhances conductivity while decreasing resistivity along the length of the member.

16. The method as set forth in claim 15, wherein, in the step of providing, the nanostructures are produced from one of carbon, copper, silver, boron, boron-nitride, or a combination thereof.

17. The method as set forth in claim 15, further comprising, concomitant to the producing step, doping the plurality of nanostructures in a solution having one of fluoride salt, chloride salt, bromide salt, iodate salt, nitrate salt, sulfate salt, or a combination thereof.

18. The method as set forth in claim 15, wherein, in the step of generating, the member defined by the plurality of nanostructures includes one of a yarn or a sheet.

19. The method as set forth in claim 18, wherein, in the step of generating, the member includes one of a plurality of yarns, a plurality of sheets, or a combination thereof.

20. The method as set forth in claim 15, wherein the step of contacting includes one of coating the member with the conductive material to permit contact with less than the total surface area of the plurality of nanostructures, intertwining a conductive wire with less than the total surface area of the plurality of nanostructures, or a combination thereof.

21. The method as set forth in claim 20, wherein, in the step of contacting, the conductive material and the conductive wire includes one of copper, aluminum, titanium, platinum, nickel, gold, silver, or a combination thereof.

* * * * *